(12) United States Patent
Murthy et al.

(10) Patent No.: US 11,184,364 B2
(45) Date of Patent: Nov. 23, 2021

(54) LOCALIZED, PROXIMITY-BASED MEDIA STREAMING

(71) Applicant: Cisco Technology, Inc., San Jose, CA (US)

(72) Inventors: Vikas S. Murthy, Stockton, CA (US); Nitesh Trikha, Alameda, CA (US)

(73) Assignee: Cisco Technology, Inc., San Jose, CA (US)

( * ) Notice: Subject to any disclaimer, the term of this patent is extended or adjusted under 35 U.S.C. 154(b) by 331 days.

(21) Appl. No.: 16/244,043

(22) Filed: Jan. 9, 2019

(65) Prior Publication Data

US 2019/0215327 A1 Jul. 11, 2019

Related U.S. Application Data

(60) Provisional application No. 62/615,161, filed on Jan. 9, 2018.

(51) Int. Cl.
*H04L 29/06* (2006.01)
*H04L 12/46* (2006.01)

(52) U.S. Cl.
CPC ........ *H04L 63/107* (2013.01); *H04L 12/4641* (2013.01); *H04L 63/0236* (2013.01); *H04L 63/101* (2013.01); *H04L 65/102* (2013.01); *H04L 65/4069* (2013.01); *H04L 63/08* (2013.01)

(58) Field of Classification Search
CPC ... H04L 63/107; H04L 67/28; H04L 63/0227; H04L 67/16; H04L 12/4641; H04L 12/427; H04N 21/4185
USPC .......................................................... 726/4
See application file for complete search history.

(56) References Cited

U.S. PATENT DOCUMENTS

| 5,764,155 | A | * | 6/1998 | Kertesz | ............... H02J 13/0086 340/3.21 |
| 6,047,323 | A | * | 4/2000 | Krause | ..................... G06F 9/54 709/227 |
| 6,415,323 | B1 | | 7/2002 | McCanne et al. | |
| 8,339,973 | B1 | * | 12/2012 | Pichumani | .......... H04L 12/4641 370/248 |
| 10,999,331 | B1 | * | 5/2021 | Marchand | ........... H04L 65/1073 |
| 2002/0161904 | A1 | * | 10/2002 | Tredoux | .............. H04L 67/2814 709/229 |

(Continued)

FOREIGN PATENT DOCUMENTS

EP 1878169 B1 * 7/2018 ......... H04L 12/2881

OTHER PUBLICATIONS

Merriam-Webster, "logical", 2021 (Year: 2021).*

(Continued)

*Primary Examiner* — Ondrej C Vostal
(74) *Attorney, Agent, or Firm* — Patterson + Sheridan, LLP

(57) ABSTRACT

Techniques for device connectivity are provided. A request to discover available cast devices is received from a first user device, and a first logically defined space is identified, where a first user associated with the first user device is authorized to access the space. A set of cast devices that correspond to the first logically defined space is determined. A first local port on a gateway device is allocated to a first cast device of the set of cast devices. Further, a response to the request is generated, where the response indicates the first local port on the gateway device. The response is transmitted to the first user device.

17 Claims, 24 Drawing Sheets

(56) References Cited

U.S. PATENT DOCUMENTS

| | | | | |
|---|---|---|---|---|
| 2004/0210775 | A1* | 10/2004 | Gbadegesin | H04L 29/1233 726/13 |
| 2006/0077988 | A1* | 4/2006 | Cheng | H04L 29/12009 370/401 |
| 2006/0293788 | A1* | 12/2006 | Pogodin | G05D 1/0011 700/245 |
| 2007/0204294 | A1* | 8/2007 | Walker | H04L 12/18 725/38 |
| 2008/0178278 | A1* | 7/2008 | Grinstein | H04L 63/0227 726/12 |
| 2008/0285482 | A1* | 11/2008 | Wahid | H04W 28/24 370/254 |
| 2009/0328087 | A1 | 12/2009 | Higgins et al. | |
| 2011/0075612 | A1* | 3/2011 | Guo | H04L 67/26 370/329 |
| 2012/0173622 | A1* | 7/2012 | Toledano | H04L 65/4076 709/204 |
| 2012/0275450 | A1* | 11/2012 | Connelly | H04L 69/08 370/352 |
| 2013/0055358 | A1* | 2/2013 | Short | H04L 47/25 726/4 |
| 2015/0100991 | A1 | 4/2015 | Risberg et al. | |
| 2015/0312648 | A1* | 10/2015 | Zhang | H04N 21/8186 725/110 |
| 2015/0326655 | A1* | 11/2015 | Quan | G06F 21/00 709/201 |
| 2016/0119284 | A1* | 4/2016 | Kim | H04L 63/0876 726/12 |
| 2016/0226999 | A1* | 8/2016 | Johnsen | H04L 67/141 |
| 2016/0261658 | A1 | 9/2016 | Taylor et al. | |
| 2016/0381110 | A1 | 12/2016 | Barnett et al. | |
| 2017/0195695 | A1* | 7/2017 | Patrick | H04N 21/4185 |
| 2018/0048590 | A1* | 2/2018 | Gordon | H04L 63/10 |
| 2018/0152519 | A1* | 5/2018 | Agarwal | H04L 63/0236 |
| 2018/0241609 | A1* | 8/2018 | Rombakh | H04L 67/28 |
| 2018/0262793 | A1* | 9/2018 | Lau | H04N 21/2187 |
| 2018/0295426 | A1* | 10/2018 | Chen | H04N 21/2146 |
| 2019/0014375 | A1* | 1/2019 | Liu | H04L 67/148 |
| 2019/0163510 | A1* | 5/2019 | Govardhan | H04L 67/10 |
| 2019/0182300 | A1* | 6/2019 | Simotas | H04L 67/16 |
| 2020/0195728 | A1* | 6/2020 | Fitzer | H04L 67/141 |

OTHER PUBLICATIONS

GeeksforGeeks, "Difference between LAN and VLAN", 2021 (Year: 2021).*

Varadrarjan, "Virtual Local Area Networks", 1997 (Year: 1997).*

GeeksforGeeks, "Difference between LAN and VLAN", 2020 (Year: 2020).*

Kim et al., :"Revisiting Ethernet: Plug-and-play made scalable and efficient", 2007 (Year: 2007).*

Matthew et al., "A Study on Virtual Local Area Network (VLAN) and Inter-VLAN Routing", 2017 (Year: 2017).*

Microsoft Computer Dictionary, "virtual LAN", "gateway", 5th edition, 2002 (Year: 2002).*

Varadarajan, "Virtual Local Area Networks", 1997 (Year: 1997).*

* cited by examiner

LOCALIZED, PROXIMITY-BASED MEDIA STREAMING

CROSS-REFERENCE TO RELATED APPLICATIONS

This application claims benefit of U.S. provisional patent application Ser. No. 62/615,161, filed Mar. Jan. 9, 2018. The aforementioned related patent application is herein incorporated by reference in its entirety.

TECHNICAL FIELD

Embodiments presented in this disclosure generally relate to techniques for streaming media to audio/video display devices. More specifically, embodiments disclosed herein relate to localized, proximity-based media streaming.

BACKGROUND

Today, users can use a number of techniques and technologies to stream or cast multimedia (e.g., video, audio, and images) to devices capable of outputting the media (such as televisions). Typically, these technologies are unsecured, such that any user device on the network (or within the range of the device) can access and control the output of the device. This is problematic in shared locations (e.g., hotels), where these unsecured technologies cause confusion and disruption. Further, current attempts to secure these devices (e.g., by requiring a passcode or physical connection) dramatically reduce the convenience and utility of the casting or streaming applications, rendering them unsuitable or unsatisfactory for use in a large number of environments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
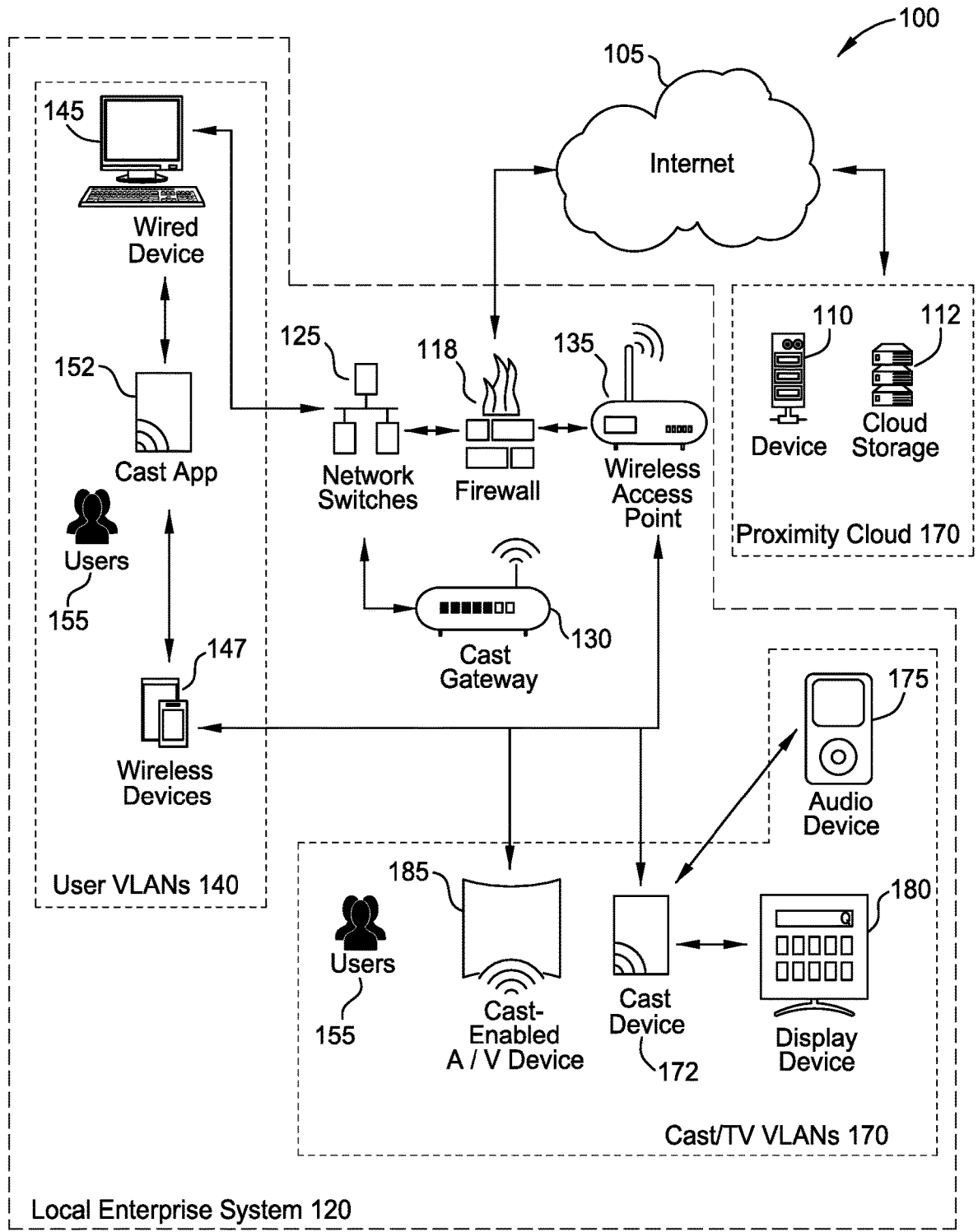
FIG. 1 illustrates a network with deployment topology, according to one embodiment of the present disclosure.

According to one embodiment presented in this disclosure, a method is provided. The method includes receiving, from a first user device, a request to discover available cast devices, and identifying a first logically defined space that a first user associated with the first user device is authorized to access. The method further includes determining a set of cast devices that correspond to the first logically defined space. The method additionally includes allocating a first local port on a gateway device to a first cast device of the set of cast devices. Further, the method includes generating a response to the request, wherein the response indicates the first local port on the gateway device. Finally, the method includes transmitting the response to the first user device.

According to a second embodiment presented in this disclosure, a gateway device is provided. The gateway device includes one or more computer processors, and logic encoded in a non-transitory medium which when executed by the one or more computer processors performs an operation. The operation includes receiving, from a first user device, a request to discover available cast devices, and identifying a first logically defined space that a first user associated with the first user device is authorized to access. The operation further includes determining a set of cast devices that correspond to the first logically defined space. The operation additionally includes allocating a first local port on a gateway device to a first cast device of the set of cast devices. Further, the operation includes generating a response to the request, wherein the response indicates the first local port on the gateway device. Finally, the operation includes transmitting the response to the first user device.

According to a third embodiment presented in this disclosure, a computer product is provided. The computer program product includes logic encoded in a non-transitory medium. The logic is executable by operation of one or more computer processors to perform an operation. The operation includes receiving, from a first user device, a request to discover available cast devices, and identifying a first logically defined space that a first user associated with the first user device is authorized to access. The operation further includes determining a set of cast devices that correspond to the first logically defined space. The operation additionally includes allocating a first local port on a gateway device to a first cast device of the set of cast devices. Further, the operation includes generating a response to the request, wherein the response indicates the first local port on the gateway device. Finally, the operation includes transmitting the response to the first user device.

Example Embodiments

Embodiments of the disclosure work with media streaming or casting software. In embodiments, media may be streamed from a user device to an output device (e.g., via screen mirroring or from storage local to the user device), or cast by a user device to an output device. In an embodiment, casting involves transmitting a URL or other unique identifier from the user device to the output device, where the identifier is used to locate the media that is to be output by the output device. Embodiments of the present disclosure enable enhanced functionality in shared environments. By way of example and not limitation, shared environments may include hotels, dormitories, theaters, conference rooms, libraries, individual seating (e.g., airplane or train seats with built-in screens) and the like.

Embodiments of the present disclosure provide a way for media streaming devices (cast devices) (e.g., televisions) associated with a location or space (e.g., a hotel room) to be logically paired with the rightful occupants of the location or individuals who rightfully should control the cast device (e.g., the occupants of the hotel room who had registered as guests at the front desk). In this manner, embodiments of the disclosure allow user devices and cast devices to be both logically and temporarily paired together, regardless of whether the devices are on the same network. Furthermore, this logical pairing may be limited for the duration of the occupant's rightful access to that location (e.g., the length of the hotel guests' stay). In this manner, embodiments of the disclosure allow users' greater control over media streaming software as well as security over their device and content.

In an embodiment, the configuration options associated with embodiments of the disclosure can be secured against unwanted users' intrusions. Furthermore, owners of the location and/or media streaming devices (e.g., hotel management) may limit the access of the users to the appropriate devices and appropriate locations. This process may occur automatically, with minimal effort or control by the location/device owners. Methods, devices and software currently exist that enable users to view their content on TV screens. These can be broadly categorized into (1) direct connection of physical devices/media containing content and direct connection of TV screens as a display; (2) network media server; (3) network-enabled screen mirroring; and, (4) casting.

If a user desires to play content on a display, one option is to simply bring a physical copy of the content to the display device and load the physical copy into the media player. For example, a user may play a Blu-ray™ movie on a Blu-ray™ player connected to a television. The user then may use a remote associated with the player to play the content. Another option is to bring the content as a file (e.g., a .avi, .mpeg or .mov file) on a data storage device (e.g., a solid state hard drive, or USB flash drive), and then connect the data storage device to a smart TV and use the media player built into the smart TV to play the content.

There are numerous disadvantages to this scenario, including: (1) the user must have the content to be played as a physical copy (e.g., a USB flash drive); (2) the display unit and media player must be compatible with the physical copy; (3) the user may be required to plug the media player into the display unit, which may be inconvenient if the correct port is difficult to access (e.g., on the back of the television); (4) the user may have to load the physical media into the media player; and (5) the user may leave one or more of their belongings behind (e.g., the Blu-ray™ disc or flash drive).

Another option is to employ a network media server. By way of example and not limitation, a network attached storage (NAS) device (such as a network-connected hard drive) may be used to contain and share content over a network. The device may support additional media sharing protocols like DLNA to enable richer discovery of content, better content-handling encoding, better playback controls etc. In addition, a network-enabled display device is used to play the content.

Disadvantages abound with this method as well, including but not limited to: (1) a physical media device and a TV screen may be required to support the necessary protocol to support content streaming through NAS; (2) a television remote control is typically used to navigate to the content and control content playback; (3) difficulty in controlling and maintaining secure access to personal content in a shared environment (e.g., a hotel room); (4) deploying a media server oftentimes requires access to the network; and (5) maintaining privacy of the content such that it is not accessible to others on the network may be difficult.

Another option is to employ screen mirroring over a network. Here, the screen of a user's device (e.g., a phone, tablet or laptop) is mirrored over a wireless network and displayed directly on the screen. Content can also be stored either on the user's device (e.g., smartphone) or the Internet, perhaps through an application or website. There are several disadvantages to this method, including (1) higher network bandwidth usage and correspondingly, lower quality streams and/or fewer users supported on a given network; (2) user difficulty in controlling access to the device; (3) a user attempting to operate this software in an enterprise scenario may see all display devices on a network and be forced to manually select their display device from a cumbersome list; (4) once a user has finally connected to a display device, the user may retain an inappropriately long amount of access to the display device (e.g., longer than the duration of the user's hotel stay); (5) some software is proprietary and protocols may be restricted to certain devices, or some software may be difficult to use and have only limited support; and (6), such software may be resource intensive for the user's device, draining battery power.

Another type of media sharing is casting using a casting app and/or associated casting device, and associated display device. Casting may support both display-capable and audio-only devices. With casting, an app on a user's device sends commands to the casting app over a secure connection to play the content. Then, the content is fetched directly by the casting app and/or associated casting device and played on the associated display device. In this manner, the user's device is largely limited to only controlling the playback or change content. Thus, the associated display device will continue playing the selected media even if the user's device is disabled or removed from the network.

However, this media sharing method is not designed for enterprise scenarios, and thus casting too, has disadvantages. Namely: (1) it may be difficult to restrict access to casted content; (2) media sharing devices may be visible and/or accessible to everyone on the network (e.g., other network users may see the user's casting device); (3) the configuration of media sharing devices may not be secured. The target user scenario for media streaming software oftentimes is home or private use. Thus, media streaming software often lacks features for temporary access to specific display units, such as large screen televisions and monitors.

As to the security of media sharing devices, it is worth noting that media sharing devices support a variety of configuration options, including device name, other network devices to be connected to, preferences to control images that are shown on the media sharing device, options to turn on guest access mode, etc. These configuration options are designed to allow users in a typical home network configure and manage the device. Oftentimes, in a home-use scenario there are no login or authentication systems required to access these settings. Thus, there may not be a method in place to secure these configuration options, which could be problematic in an enterprise/shared scenario. For example, changing these configuration options in a shared network can disable the system and prevent others from accessing it. Other results include inappropriate messages or images being displayed to other users of the device, allow unauthorized access via guest login, etc.

As another example of the limitations of media streaming software, if a user were to deploy media streaming software in, for example, a hotel environment, then it is likely that every visitor that connects to the hotel can stream media to any screen in any room. Generally speaking, this is undesirable, as unauthorized viewers in hotel rooms may obtain access to the user's streamed media, completely unbeknownst to the user.

As used herein, "media sharing" and "content sharing" may refer to sharing of one or more of the following a user's audio, video, picture content, often for the purposes of screen playback or audio playback. A "cast device," in some embodiments, may include but is not limited to the following: cast-enabled devices, display devices, and/or audio devices. Similarly, a "cast-enabled device," in some embodiments, may include smart TVs, music players and other audio/visual devices capable of streaming media. In some embodiments, a "space" may refer to any location, such as a building or a floor of a building, an area of campus or other region or location, a room, and the like. Further, in some embodiments, a space may be broken up into multiple logical "spaces," such as rooms in a hotel, dormitory rooms, or meeting rooms. Such logical spaces may be associated with one or more cast devices and/or user devices.

Embodiments of the disclosure enable cast devices to be used in an enterprise scenario with multiple unknown network members that are unauthorized to use the cast device. Embodiments of the disclosure advantageously provide unique capabilities currently not available to said users. For example, some embodiments of the present disclosure serve as dynamic access control or filtering layers in addition to enabling casting of content. In one embodiment, visibility of cast devices is restricted in a space (e.g., a hotel room) to users who are associated with that space (e.g., users who are hotel guests and are checked-in to said hotel room). In this manner, users will not be able to view or interact with cast devices in other spaces/rooms and vice versa.

In some embodiments of the present disclosure, the length of time a user is allowed to see and/or and access cast devices is controlled (for example users lose access to a room's TV when the user checks out). In an embodiment, others are prevented from making changes to casting device's configuration. In at least one embodiment of the present disclosure, the disclosed system integrates with external enterprise systems to infer associations of users to spaces. By example and not limitation, in a hotel environment, embodiments of the disclosure may use a Property Management System (PMS) deployed by the hotel in conjunction with a loyalty system to determine association of a user to a room. As another example, in a college dormitory use case, embodiments of the disclosure may integrate with a student database system to determine allocation of rooms to students staying in the dorm. In this manner, a student's device may be automatically associated with that student's room's display device for the duration of the user's stay in the room or space.

In one embodiment of the present disclosure, enterprises are provided with the ability to track and analyze user behavior when casting. This ability may be highly advantageous for enterprises to better understand their user's needs. By way of example and not limitation, embodiments of the disclosure could allow a hotel's IT team to track guest's played content and viewing patterns.

In some embodiments of the present disclosure, users are provided with displayed usage instruction and, in one embodiment, promotional content. This promotional content may be personalized to the user's tastes, such as through behavior tracking and analysis, as mentioned above. In this manner, the promotional content may be more likely to result in purchases, transactions, brand awareness and increased loyalty between the user and the enterprise's partners and products. For example, in an embodiment, a user who casts food-related content or shows, as well as science documentaries or shows, may have their viewing patterns analyzed and tracked by a hotel's IT team, thus resulting in a targeted advertisement, such as a space-themed blender.

FIG. 1 illustrates a network with deployment topology, according to one embodiment of the present disclosure. In the illustrated embodiment, a Proximity Cloud 107 is connected to (or included in) the Internet 105. Contained within the Proximity Cloud 107 is one or more Servers 110 and Cloud Storage 112. Proximity Cloud 107 may refer to a set of related services running on the cloud to enable, among other things, the functionality of embodiments of the disclosure. FIG. 1 also illustrates a Local Enterprise System 120, which is connected to the Internet 105. In an embodiment, the Local Enterprise System 120 includes one or more of the following: a Firewall 118, Network Switches 125, a Cast Gateway 130, Wireless Access Point 135, User Virtual Local Area Networks (User VLANs 140) and Cast/TV VLANs 170. In some embodiments, the Firewall 118, Network Switches 125, and Wireless Access 135 provide Internet access to users of the Local Enterprise System 120.

In one embodiment, the Local Enterprise System 120 corresponds to a logical space consisting of a single contiguous network where users of the Local Enterprise System 120 employ embodiments as contemplated herein. By way of example and not limitation, a logical space may be spread across multiple buildings and/or floors. In the illustrated embodiment, each of the User VLANs 140 include one or more of the following: Wired User Devices 145, which may be connected to Internet 105 via Network Switches 125, and a proximity Cast Application 152, which may be executed on Wired User Devices 145 for a User 155. In one embodiment, Wired User Devices 145 may include, for example, laptops, PCs and computers. In one embodiment, Network Switches 125 may be capable of supporting multiple user VLANs and trunk ports (not shown), connecting embodiments of the disclosure. In some embodiments, Wired User Devices 145 may be assigned to one or more User VLANs 140, such that they are unable to connect (directly) to other User VLANs 140, or to any Cast/TV VLANs 170.

Further, in the illustrated embodiment, each User VLAN 140 may also include Wireless User Devices 147, which may be connected to Internet 105 via the Wireless Access Point 135. In one embodiment, the proximity Cast Application 152 is executed on the Wireless User Devices 147, which in turn benefits the User 155. In embodiments, the Wireless User Devices 147 can include, for example, smartphones, tablets, laptops and personal digital assistants. In one embodiment, the Wireless User Devices 147 are assigned to one or more User VLANs 140. In an embodiment, Wireless Access Point 135 serves the Wireless User Devices 147 as well as Cast Devices 172 and 185. In embodiments, the Wireless Access Point(s) 135 operate with or without wireless controllers. In some embodiments, the Wireless Access Point(s) 135 support association of the devices or SSIDs of an individual or user to different User VLANs 140. This association may be achieved through known means. As used herein, Wired User Devices 145 and Wireless User Devices 147 may be referred to herein collectively as User Devices 145 and/or 147.

In the illustrated embodiment, each Cast/TV VLAN 170 corresponds to a respective space or area (e.g., a hotel room), and can include one or more of the following: Cast Device(s) 172, Audio Device(s) 175, Display Device(s) 180, and Cast-Enabled A/V Device(s) 185. In some embodiments, each Cast Device 172 is a portable, hot-swappable wireless transceiver capable of streaming media to other devices that are logically paired to the Cast Device 172. In one embodiment, each Cast Device 172 is Internet-enabled via the Wireless Access Point(s) 135, and, in alternative embodiments not shown, via the Network Switches 125. In the illustrated embodiment, the Cast-Enabled AN Device(s) 185 is Internet-enabled in a similar manner to the Cast Device(s) 172. In an embodiment, the Cast Device(s) 172 and Cast-Enabled A/V Device(s) 185 may be referred to collectively as Cast Devices 172 and/or 185. Further, in an embodiment, the Audio Device(s) 175, can include mp3 players, speakers and/or amplifiers, and the like. The Display Device(s) 180 can include, for example, TV screens. In an embodiment, the Display Device(s) 180 and/or Audio Device(s) 175 are Internet-enabled at least via a Cast Device 172. In this manner, the elements of Cast/TV VLAN 170 can receive media content from Internet 105, and/or from User Devices 145 and/or 147.

As mentioned above, in one embodiment, the Firewall 118 is connected to Network Switches 125 and/or Wireless Access Point(s) 135, as well as one or more of the elements connected to the Network Switches 125 and Wireless Access Point(s) 135. In this embodiment, it is important to note that the Firewall 118, Network Switches 125, and/or Wireless Access Points 135 may separate and/or restrict traffic between User VLANs 140 and Cast/TV VLANs 170. In this manner, Users 155 on User VLANs 140 are not allowed direct access to elements connected to the Cast/TV VLANs 170 (such as the Cat Devices 172). Further in this embodiment, the Cast Gateway 130 is connected to the User VLANs 140 and to Cast/TV VLANs 170. In one embodiment, the Cast Gateway 130 acts as a proxy between the User VLANs 140 and Cast/TV VLANs 170, as discussed in more detail below.

Figure 2:
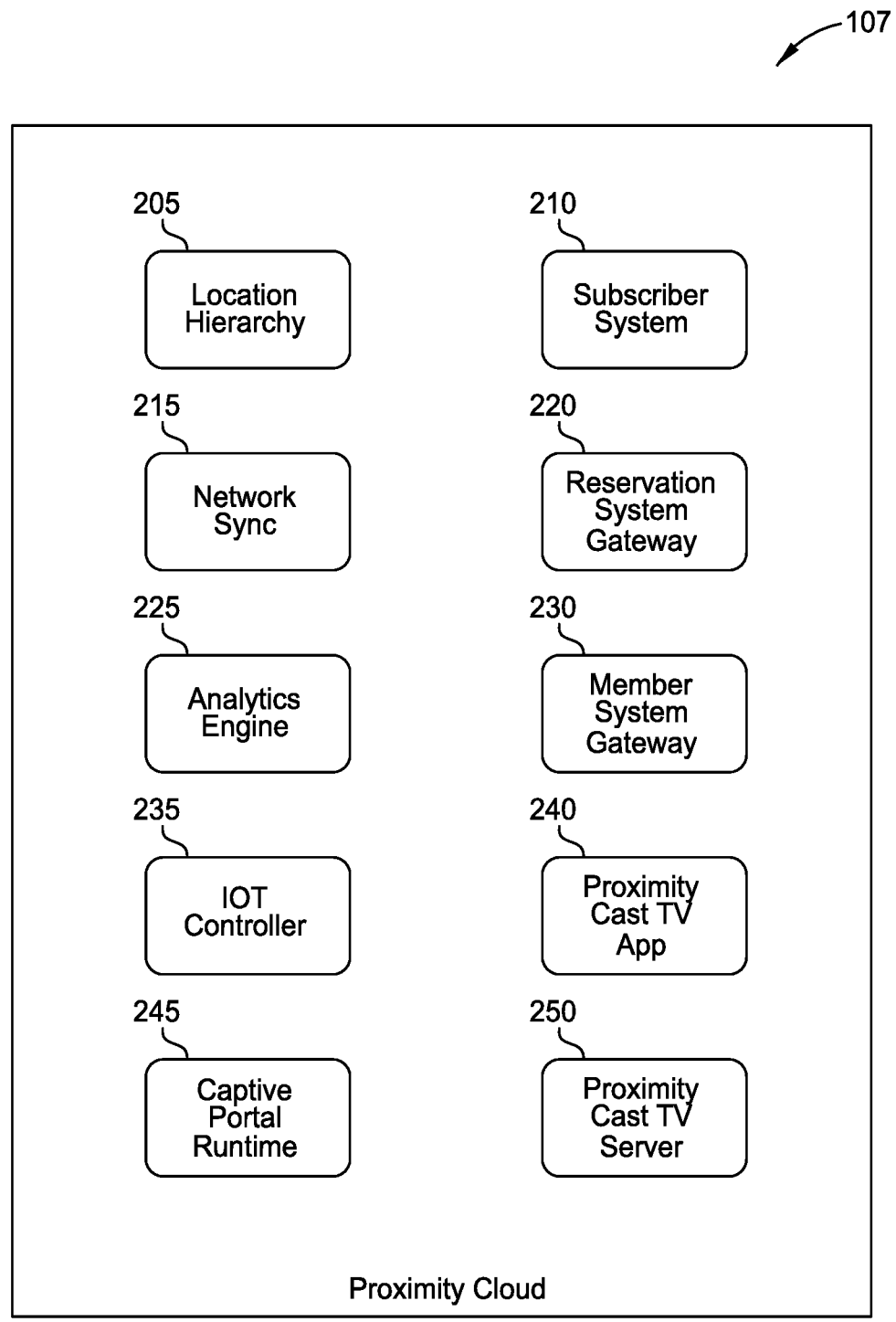
FIG. 2 depicts a proximity cloud, according to one embodiment of the present disclosure.

FIG. 2 illustrates a proximity cloud, according to one embodiment of the present disclosure. The Proximity Cloud 107 can include, by way of example and not limitation, a Location Hierarchy 205, a Subscriber System 210, Network Sync 215, Reservation System Gateway 220, an Analytics Engine 225, Member System Gateway 230, an Internet of Things (IoT) Controller 235, a Proximity Cast TV app 240, a Captive Portal Runtime 245, and a Proximity Cast TV Server 250. In one embodiment, the illustrated elements in FIG. 2 can be hosted in the cloud, and can be interconnected using data buses and/or internal APIs. Although depicted as discrete components for illustration, in embodiments, the functionality of the illustrated components can be combined or divided across any number of components, and may be implemented using hardware, software, or a combination of hardware and software.

In one embodiment, the Location Hierarchy 205 is a hierarchical model of variables associated with embodiments of the disclosure, including but not limited to: regions, groups, organizations, networks, campuses, buildings, floors, zones, spaces, rooms, and the like. In some embodiments, these variables are used to model a network topology and/or business hierarchy. In an embodiment, the Location Hierarchy 205 contains a mapping of network infrastructure (such as WiFi access points). In some embodiments, the Location Hierarchy 205 is used to identify the location of users in an enterprise environment (e.g., a college campus or hotel). For example, in an embodiment, an enterprise environment such as a campuses and/or building may be mapped to logical entities, similar to a local enterprise system. Further in an example, a building or floor on the campus or hotel may be broken up into logical spaces, such as dormitory rooms or meeting rooms. These logical spaces can be associated with one or more cast devices. In some embodiments, the cast devices associated with one or more logical spaces are not associated with other logical spaces (such that each cast device is associated with one or more spaces, such as the room(s) where the device is, and is not associated with other spaces, such as other rooms on the same floor).

In one embodiment, the Subscriber System 210 is responsible for identifying users based on or more user attributes, including but not limited to MAC addresses, location, metadata described herein, or personal data. In some embodiments, the Subscriber System 210 also stores additional attributes for users including but not limited to authorization status, loyalty/membership information, room number, other metadata described herein, and/or personal information. In some embodiments, these attributes are used to recognize users in anticipation of the users' future visits to the local enterprise system, as well as to provide personalized services (e.g., marketing) to users.

In one embodiment, the Network Sync 215 is responsible for importing network topology information to the Proximity Cloud 107, including but not limited to: networks, campuses, buildings, floors, etc. In one embodiment, this topology information can be used to update the Location Hierarchy 205. In some embodiments, the Network Sync 215 also retrieves one or more lists of wireless transmission systems such as wireless access points and Bluetooth™ low energy beacons. In further embodiments, Network Sync 215 can also be responsible for making configuration changes in the network that assist in enabling embodiments of the present disclosure to function.

In some embodiments, a Reservation System Gateway 220 is responsible for integrating with external reservation systems that allocate spaces to users. For example, in a hotel environment, external reservation systems may typically be handled by a Property Management System (PMS). In an example, a room (or any other logical space) is allocated to one or more guest users for the duration of the guest's stay. In one embodiment, the Reservation System Gateway 220 utilizes this information to determine the links or associations between logical spaces and the users who should be able to control devices in the logical space. In an embodiment, the Reservation System Gateway 220 propagates this user information via the IOT Controller 235, described herein, to one or more cast gateways.

In some embodiments, an Analytics Engine 225 assists in enabling embodiments of the present disclosure used in user behavior analysis. In some embodiments, behavior analysis and reporting can be accomplished by storing detailed logs of user activity in a database, and processing the logs to derive insights about user behavior and to generate reports. In one embodiment, user activity can include analysis of user devices, how users are authenticated on the network, how users connect to embodiments of the disclosure, cast app statistics (application type, duration of usage, time of day etc.), as well as content viewed by users.

In some embodiments, the Member System Gateway 230 is responsible for integrating with a loyalty/CRM/Enterprise Directory or similar membership system. In these embodiments, the Member System Gateway 230 handles the authentication of users on the member system (such as a customer-hosted loyalty database or a CRM database). In one embodiment, the Member System Gateway 230 maps user devices to a unique identifier (not shown) for each user. In further embodiments, the Member System Gateway 230 also retrieves attributes of users (e.g., a membership level, etc.) that can be used to personalize services for users.

In some embodiments, the IOT Controller 235 is a component hosted in Proximity Cloud 107 for managing cast gateways. Cast gateways can connect to the IOT Controller 235 over multiple channels including but not limited to: TFTP, SSH, HTTP, HTTPS and WebSockets. In one embodiment, the IOT Controller 235 authenticates cast gateways, and associates cast gateway to appropriate nodes in the Location Hierarchy 205.

In one embodiment, the IOT Controller 235 retrieves information on logical spaces from the Location Hierarchy 205, including information related to the association of cast devices to logical spaces. In embodiments, a logical space may be associated with more than one cast device (e.g., a suite with a cast-enabled A/V device in the den and a cast device in the bedroom). Subsets of the information relevant to the specific location can be sent across to a cast gateway. In some embodiments, the IOT Controller 235 also tracks users in specific locations. In an embodiment, the IOT Controller 235 can track users based on data in the Subscriber System 210, and data retrieved from the Member System Gateway 230, and pass the appropriate information to a cast gateway.

In one embodiment, the IOT Controller 235 retrieves reservation data from the Reservation System Gateway 220 for a specific location, and passes this reservation data to one or more cast gateways. In some embodiments, the IOT Controller 235 also coordinates other operations, including, for example, provisioning and/or setup of the cast gateway(s), network configuration, location data, and transmitting cast device configuration information from the Location Hierarchy 205 to the cast gateway(s).

In some embodiments, the Proximity TV App 240 is an HTML-based application that is designed to run on cast devices. The Proximity TV app 240 can be used to provide instructions, informational content, promotional content, and the like to users that are using embodiments of the present disclosure, which can minimize the need for user education through other means.

In some embodiments, the Proximity Cloud 107 can also include a Proximity TV App Server 250 which hosts the Proximity TV App 240 and enables the Proximity TV App 240 to function. In an embodiment, the Proximity TV App Server 250 can be used to customize the content shown in the Proximity TV App 240 based on, for example, an overall configuration, a customer specific configuration, a location of users or the proximity of users to cast devices (e.g., the Proximity TV App 240 can display different experiences based on whether a user is in the room or not), and based on information about users from the Location Hierarchy 205, Subscriber System 210, Reservation System Gateway 220, and Member System Gateway 230. In some embodiments, unique content can be shown in the Proximity TV App 240 for users who have never used the system (e.g., more detailed instructions) versus experienced users who have previously used the system.

In some embodiments, the Captive Portal Runtime 245 is responsible for authenticating users and associating them with member system information and/or reservation system information. In an embodiment, this authentication can be accomplished using captive portals, which may be launched automatically when user devices are connected to the network. In embodiments, the authentication can be achieved through any known means. In some embodiments, the Captive Portal Runtime 245 is also responsible for provisioning Internet access on user devices.

Figure 3:
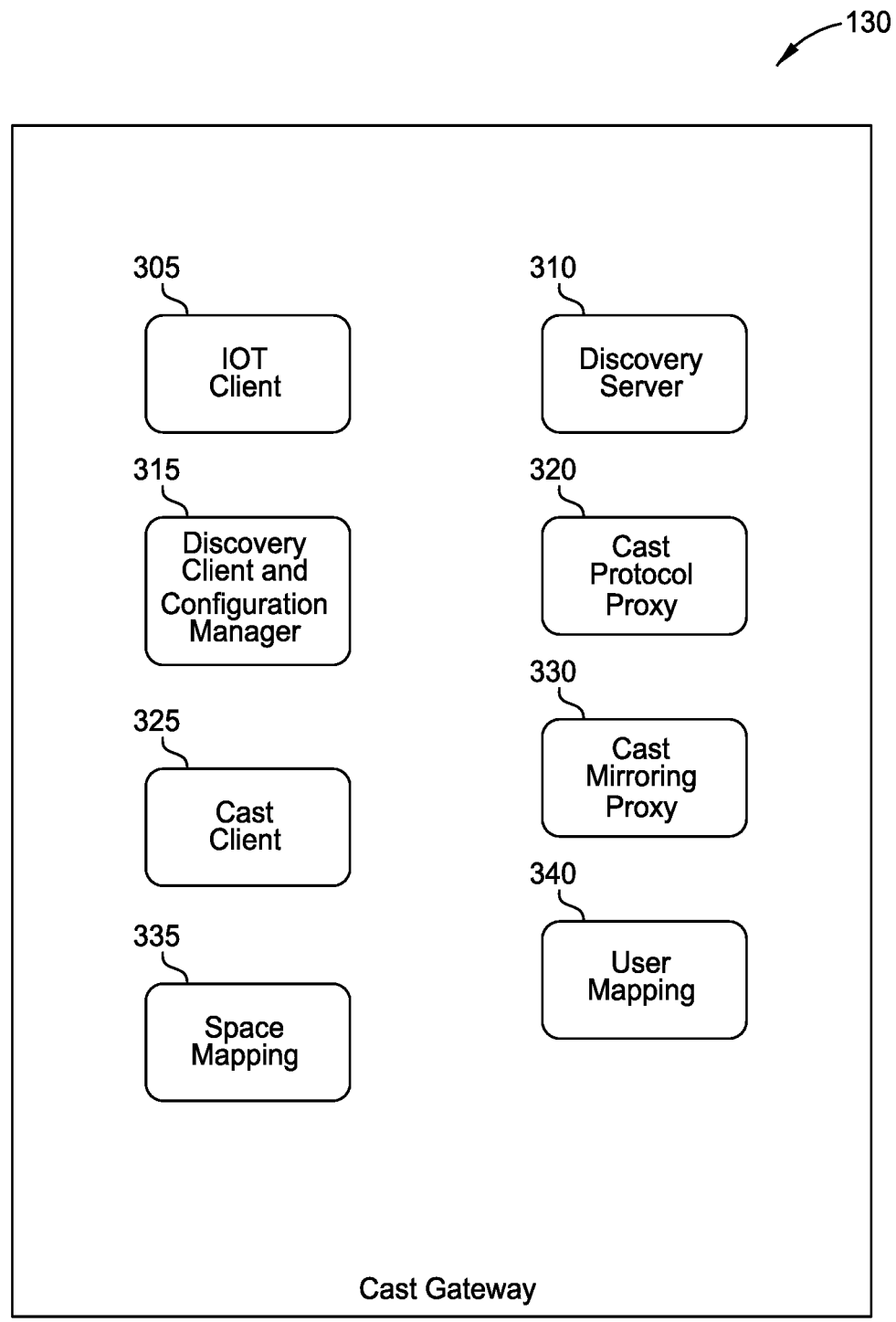
FIG. 3 is a block diagram illustrating a cast gateway, according to one embodiment of the present disclosure.

FIG. 3 illustrates a cast gateway, according to one embodiment of the present disclosure. In the illustrated embodiment, the Cast Gateway 130 includes an IOT Client 305, Discovery Server 310, a Discovery Client and Configuration Manager 315, a Cast Protocol Proxy 320, a Cast Client 325, a Cast Mirroring Proxy 330, a Space Mapping 335, and a User Mapping 340. In one embodiment, the elements in FIG. 3 may be interconnected using internal APIs and may be hosted at each Cast Gateway 130 deployed on premise. Although depicted as discrete components for illustration, in embodiments, the functionality of the illustrated components can be combined or divided across any number of components, and may be implemented using hardware, software, or a combination of hardware and software.

In one embodiment, the Cast Gateway 130 is deployed at one or more local enterprise systems and enables embodiments of the present disclosure for those local enterprise systems. In some embodiments, the Cast Gateway 130 is connected to a network over a trunk port (not shown) that provides access to multiple VLANs (including, but not limited to: user VLANs and/or cast/TV VLANs). Optionally, in some embodiments, the Cast Gateway 130 is connected to user VLANs using multiple network cards.

In some embodiments, the IOT Client 305 is responsible for handling communication with an IOT controller in the Proximity Cloud 107. In one embodiment, the IOT Client 305 maintains a persistent Web Socket connection to receive updates from the IOT controller. In this embodiment, updates may then be stored in a Space Mapping 335 and/or User Mapping 340.

In some embodiments, the Discovery Server 310 has multiple responsibilities, including (1) handling multicast discovery requests from user devices, (2) identifying devices by mapping remote IP addresses to media access control (MAC) addresses using Address Resolution Protocol (ARP), (3) retrieving mapping of MAC address to users and/or to spaces from the User Mapping 340, and (4) mapping of spaces to cast devices from the Space Mapping 335. In some embodiments, the Discovery Server 310 also validates that cast devices are configured correctly, and currently active. In these embodiments, the Discovery Server 310 utilizes the Discovery Client and Configuration Manager 315, as discussed in more detail below. In an embodiment, if users are currently authorized to use one or more cast devices, the Discovery Server 310 responds to their discovery request(s) over unicast, and includes information related to the cast devices the user is currently authorized to access. In this embodiment, the time to live (TTL) can be set according to the validity of the association.

In some embodiments, the Discovery Client and Configuration Manager 315 is responsible for discovering cast devices using multicast. In an embodiment, once a cast device is discovered, the Discovery Client and Configuration Manager 315 utilizes HTTP-based configuration protocols (which may be specific to the cast device) to discover and validate the current configuration of that cast device. In some embodiments, configuration of the device can be automatically updated. Once ready, the Cast Client 325 can be instructed to connect to that cast device.

In some embodiments, the Cast Protocol Proxy 330 acts as a filtering proxy. More specifically, cast devices can use a secure TLS-based protocol to communicate with embodiments of the present disclosure. In some embodiments, user devices perform a device authentication operation to validate using Public Key Encryption (PKI) technology that may end-point match the device discovered using multicast, and may also verify that the device is an official cast end point. In one embodiment, only control messages may be sent over this protocol. In this manner, the Cast Protocol Proxy 330 can act as a Layer 4 filtering proxy/network address translation (NAT) without disrupting the TLS session. In some embodiments, the decision to allow or deny the connection may be based on mapping the remote IP of the user device to cast devices in a manner similar to the mapping performed by the Discovery Server 310.

In some embodiments, the Cast Client 325 emulates cast app software, and connects to cast devices using cast protocol over TLS. In an embodiment, this connection may be in parallel to connections being made by user devices to cast devices. Using this connection in this manner, the Cast Client 325 can discover applications being launched by user devices on cast devices. In this manner, when an application stops or if cast devices begin idling, the Cast Client 325 can automatically launch a Proximity Cast TV app. In one embodiment, the Cast Client 325 triggers capabilities built into cast devices that allow the Cast Client 325 to automatically turn on a display and switch to the correct input source. This allows the Cast Client 325 to contextually turn on a display, and to show targeted and/or personalized messages to the user. For example, in one embodiment, the Cast Client 325 displays a welcome message on a cast device when a hotel guest walks into their room after check-in, based on pinpointing (or estimating) the user's location using WiFi triangulation or other means. In this manner, the Cast Client 325 can track the cast applications used by Users 155, and pass analytical data to an Analytics Engine 225. In another example, if a determination is made that a cast device is off or has lain idle for a predetermined period of time, targeted and/or personalized messages may be shown to the user.

In some embodiments, the Cast Client 325 also emulates specific cast applications, allowing the Cast Client 325 to track user usage within a specific application. By way of example and not limitation, this method may be used to obtain metrics on any or all individual videos being played, as opposed to tracking user history at the level of the broader application.

In some embodiments, the Cast Mirroring Proxy 330 can proxy a screen mirroring protocol. More specifically, some cast applications use screen mirroring technology to share content directly from user devices to cast devices. In this manner, content may be transmitted on a UDP-based protocol where the details of the port are negotiated directly between user devices and cast devices using cast protocol. In this manner, the Cast Mirroring Proxy 330 can use information from Cast Client 325 and a heuristic algorithm to proxy screen mirroring protocol. In some embodiments, the Space Mapping 335 maintains a mapping of logical spaces to cast devices. Finally, in an embodiment, the User Mapping 340 maintains a mapping of MAC addresses to users, and/or a mapping of users to spaces.

In embodiments, the Cast Gateway 130 acts as a sort of "middleman" between user devices and cast devices. That is, in some embodiments, user devices cannot directly connect to the cast devices (e.g., because they are on separate VLANs), and the Cast Gateway 130 facilitates and mediates interaction between the devices. For example, in an embodiment, the Cast Gateway 130 can either allow or block connection from a user device to a cast device based on whether the associated user is associated with the logical space to which the cast device is assigned. In this way, embodiments of the present disclosure enable users to interact with only the cast devices to which they are assigned, and only for the defined period of such assignment, which improves the functionality of the overall system and network.

Figure 4:
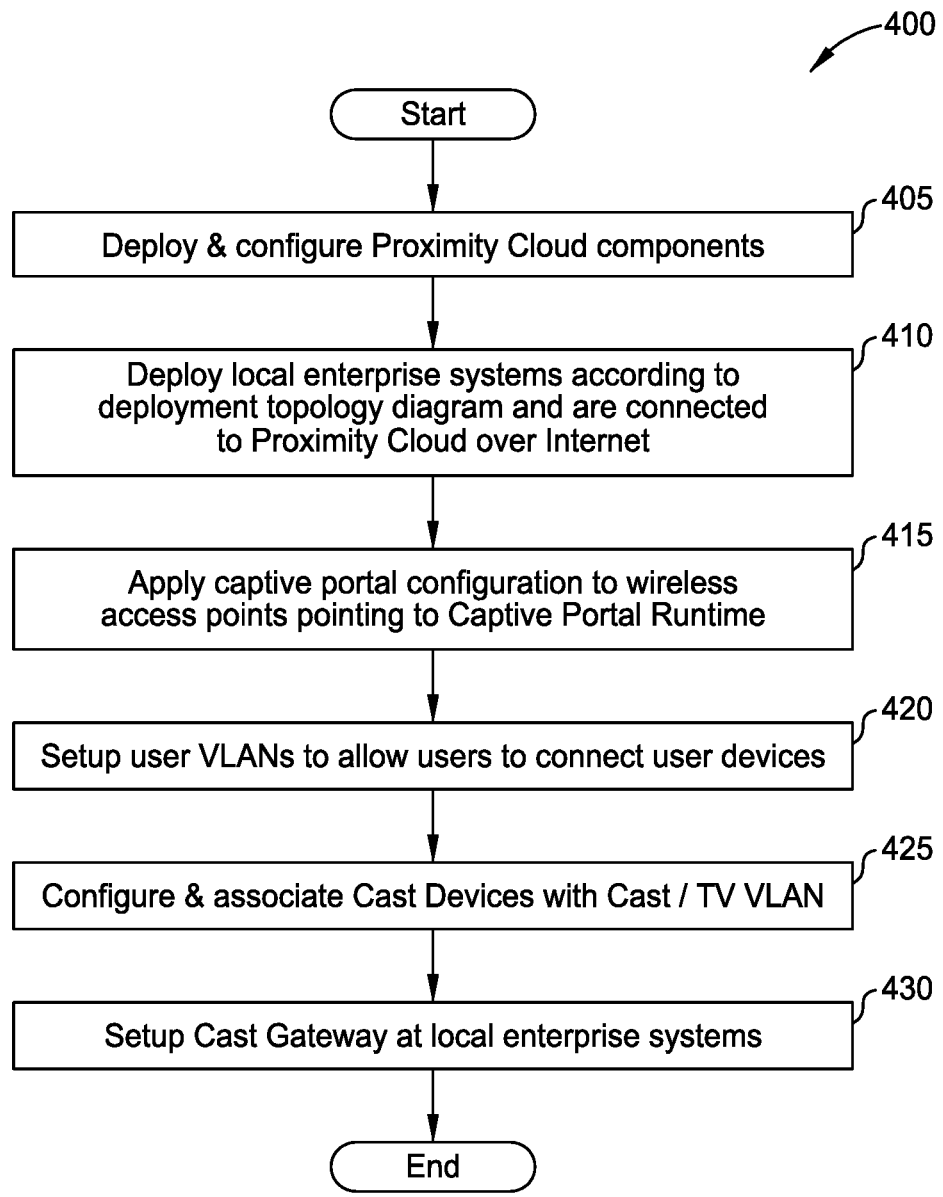
FIG. 4 is a flow diagram illustrating a method for pre-setup of proximity cast technology, according to one embodiment of the present disclosure.

FIG. 4 illustrates a method for the initial setup of Proximity Cast technology, according to one embodiment of the present disclosure. Although the method steps are described in conjunction with FIGS. 1-9, persons skilled in the art will understand that any system configured to perform the method steps, even in a different order, may fall within the scope of the present disclosure. Moreover, the steps in this method are illustrative only and do not necessarily need to be performed in the given order they are presented herein. In some embodiments, certain steps may be omitted completely.

The method 400 begins at block 405, where components of a proximity cloud are deployed and configured on the cloud (e.g., by an administrator) and are made accessible over the Internet. The method 400 then proceeds to block 410, where one or more local enterprise systems are set up according to a deployment topology diagram (e.g., by an administrator of the local enterprise system). In one embodiment, a deployment topology diagram (by way of example and not limitation, such as that shown in FIG. 1) may be controlling in this step. In embodiments, local enterprise systems can then be connected to the proximity cloud over the Internet. In one embodiment, the local enterprise system is connected to the proximity cloud using VPN technology.

At block 415, a captive portal configuration is applied to the wireless access points, pointing to a captive portal runtime. In this way, when users initially connect to the wireless access point, they are forwarded to the captive portal runtime for authentication and validation. The method 400 then proceeds to block 420, where one or more user VLANs are set up, allowing users to connect to the local enterprise system using their user devices. At block 425, cast devices are configured and associated with respective cast/TV VLANs. In one embodiment, each logical space or grouping of spaces is associated with a respective VLAN, and each cast device is associated with or linked to the appropriate VLAN (e.g., based on the physical space where the cast device resides). The method 400 then proceeds to block 430, where a cast gateway is setup at the local enterprise system, after which the method 400 ends.

Figure 5A:
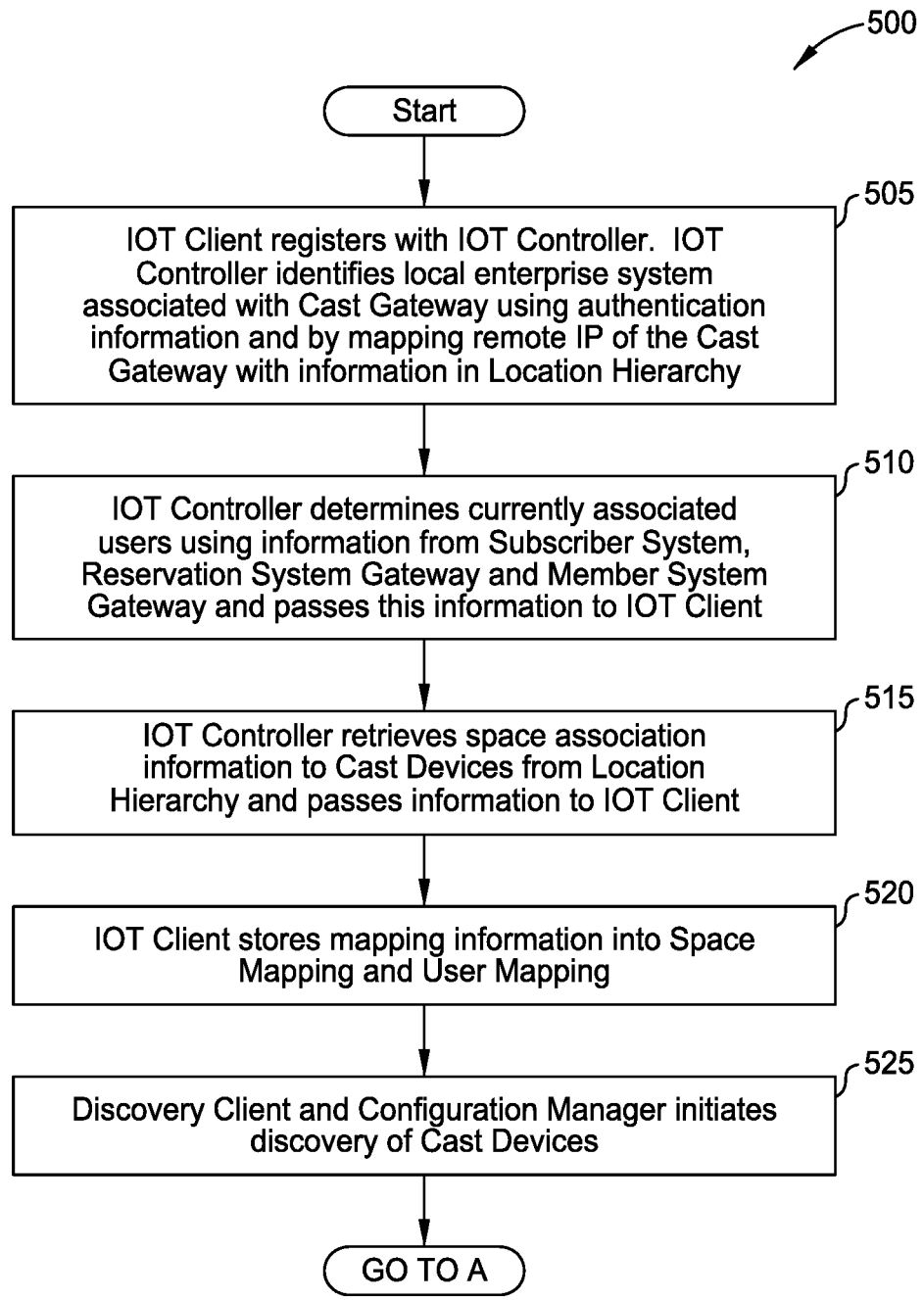
FIGS. 5A, 5B and 5C are flow diagrams illustrating a method for initial launch of a proximity cast gateway, according to one embodiment of the present disclosure.
Figure 5B:
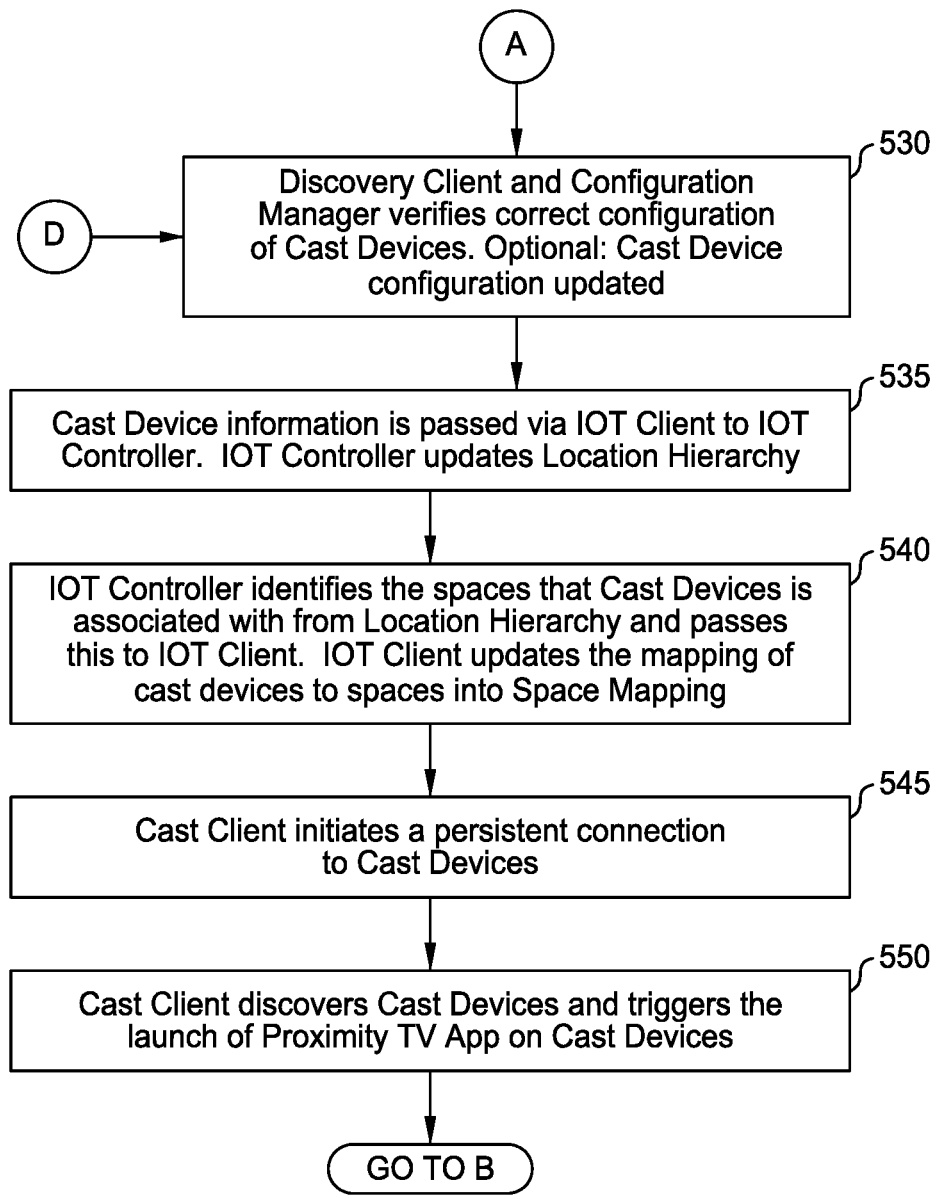
Figure 5C:
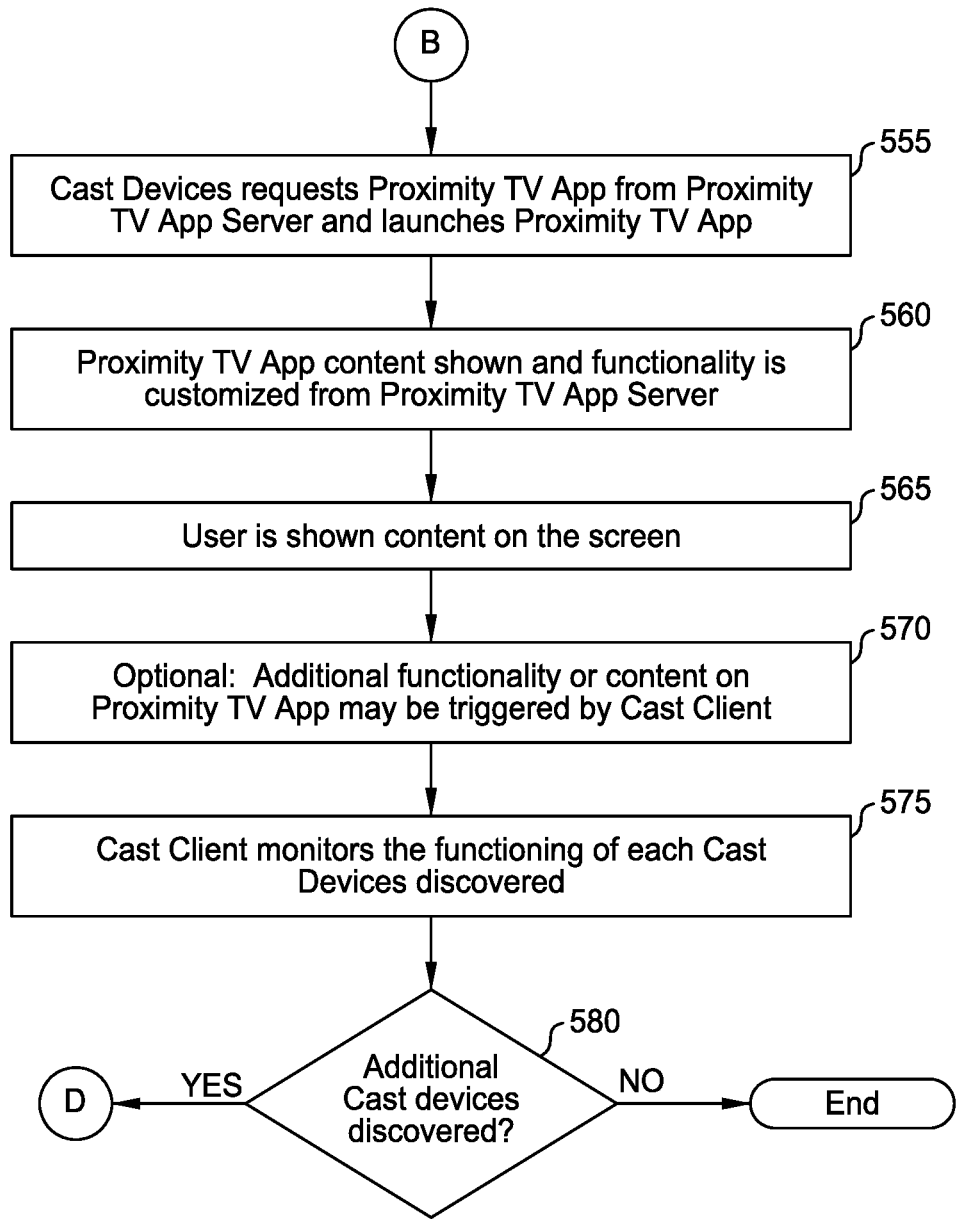

FIGS. 5A, 5B and 5C illustrate a method for the initial launch and initialization of a Proximity Cast Gateway 130, according to one embodiment of the present disclosure. Although the method steps are described in conjunction with FIGS. 1-9, persons skilled in the art will understand that any system configured to perform the method steps, in any order, falls within the scope of the present disclosure. The steps in this method are illustrative only and do not necessarily need to be performed in the given order they are presented herein. Some steps may be omitted completely.

The method 500 begins at block 505, where an IOT client (e.g., on a Proximity Cast Gateway 130) registers with an IOT controller (e.g., in the Proximity Cloud 107). In one embodiment, an IOT controller identifies the local enterprise system associated with the cast gateway, such as by using authentication information, or by mapping the remote IP of the cast gateway with information maintained in a location hierarchy. The method 500 then proceeds to block 510, where the IOT controller determines a set of currently-associated users based on information from a subscriber system, a reservation system gateway, and/or a member system gateway. This information is then passed to the IOT client.

At block 515, the IOT controller retrieves information about logical spaces and associations between spaces and cast devices from the location hierarchy, and passes this information on to the IOT client. The method 500 then proceeds to block 520, where the IOT client utilizes this information to store or update the mapping information contained in the space mapping and/or user mapping. At block 525, the discovery client and configuration manager initiates discovery of the cast devices that are available in the local enterprise system.

The method 500 then proceeds to block 530, where the discovery client and configuration manager verifies that the discovered cast devices are configured correctly. In one embodiment, if needed, the cast device configurations can also be updated at this time. At block 535, cast device information is passed via the IOT client to the IOT controller. Further, in an embodiment, the IOT controller updates the location hierarchy based on this cast device information, as appropriate. The method 500 continues to block 540, where the IOT controller identifies, for each respective cast device of the set of discovered cast devices, which logical space(s) the respective cast device is associated with, based on the location hierarchy. The IOT controller then passes these identified spaces and associations to the IOT client. In this way, the IOT client can determine, for each cast device, which space(s) the cast device is associated with. In one embodiment, the IOT client utilizes this information to update the space mapping.

The method 500 then continues to block 545, where the cast client initiates a persistent connection to each of the discovered cast devices. At block 550, the cast client determines or discovers the state of each of the cast devices, and triggers launch of a Proximity TV app on each of the cast devices. The method 500 continues to block 555, where each of the cast devices request the Proximity TV app from the Proximity TV app server, and launch the Proximity TV app for users to use. At block 560, the content in the Proximity TV App 240 is output on each of the cast devices, and functionality is customized for each cast device by the Proximity TV app server. At block 565, instructions or other content is depicted or output by the cast devices (e.g., on a screen, or via audio). Optionally, at block 570, additional functionality or content on the Proximity TV app 240 can be triggered by the cast client 325.

The method 500 then proceeds to block 575, where the cast client monitors the functioning of each discovered cast device. At block 575, the discovery client and the configuration manager continue to monitor for additional cast devices to be added or initialized. Further, at block 580, a determination is be made as to whether additional cast devices have been discovered. If so, the method 500 returns to step 530, and repeats for each newly discovered cast device. If no additional cast devices are discovered, the method 500 terminates.

Figure 6A:
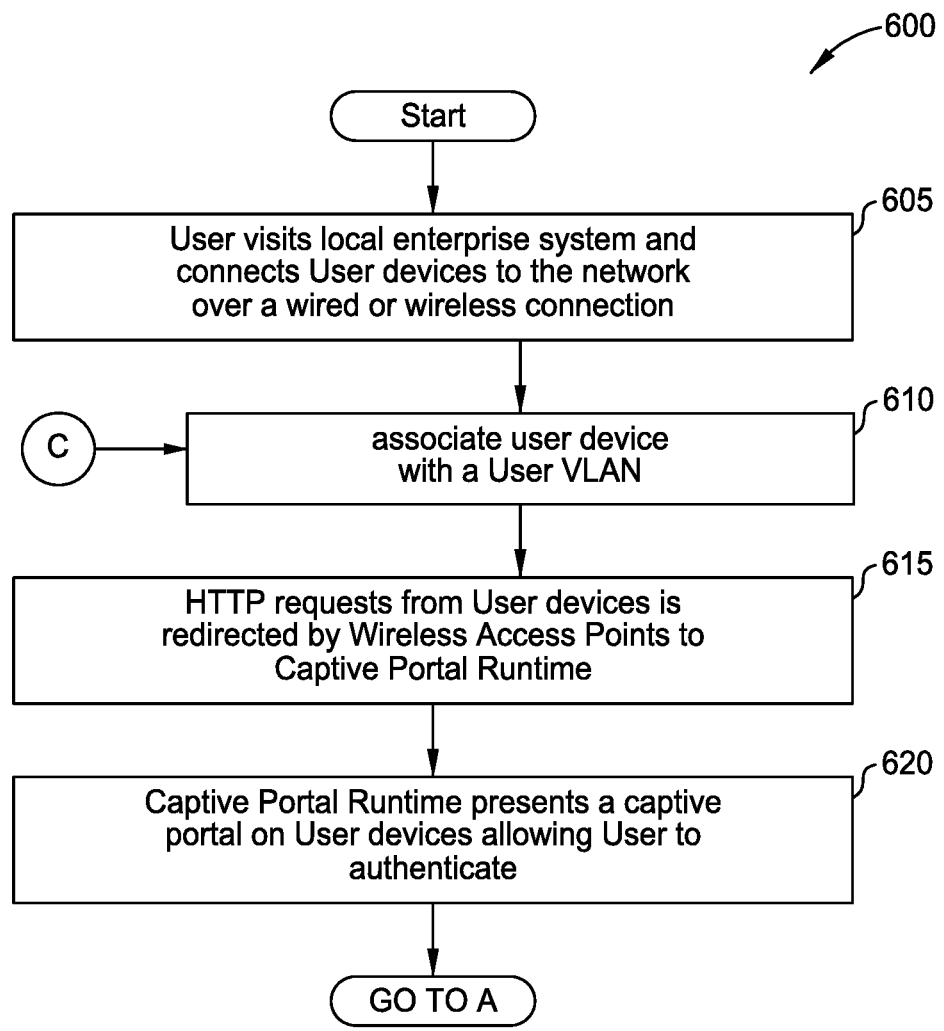
FIGS. 6A, 6B and 6C are a flow diagrams illustrating a method for a first connection, according to one embodiment of the present disclosure.
Figure 6B:
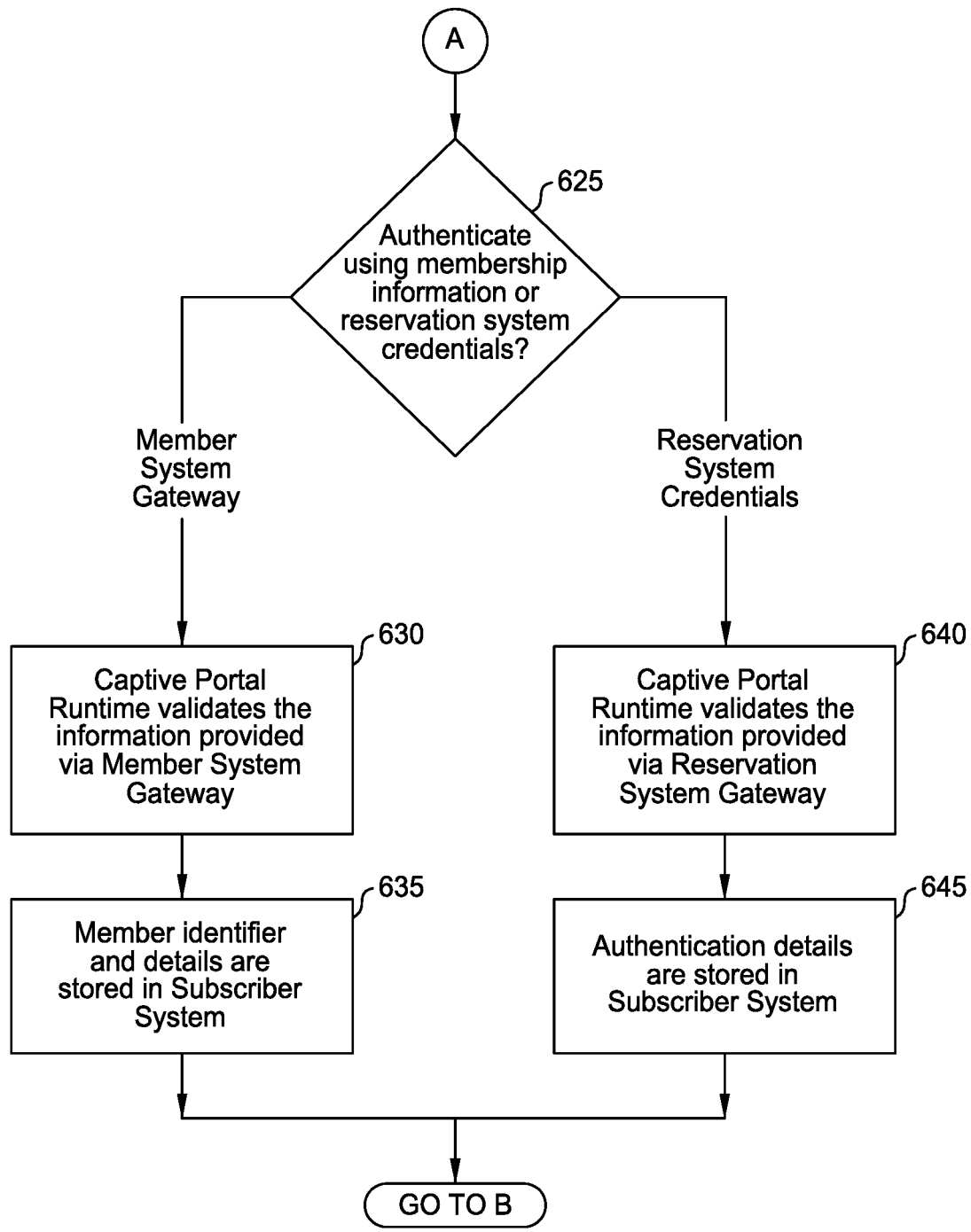
Figure 6C:
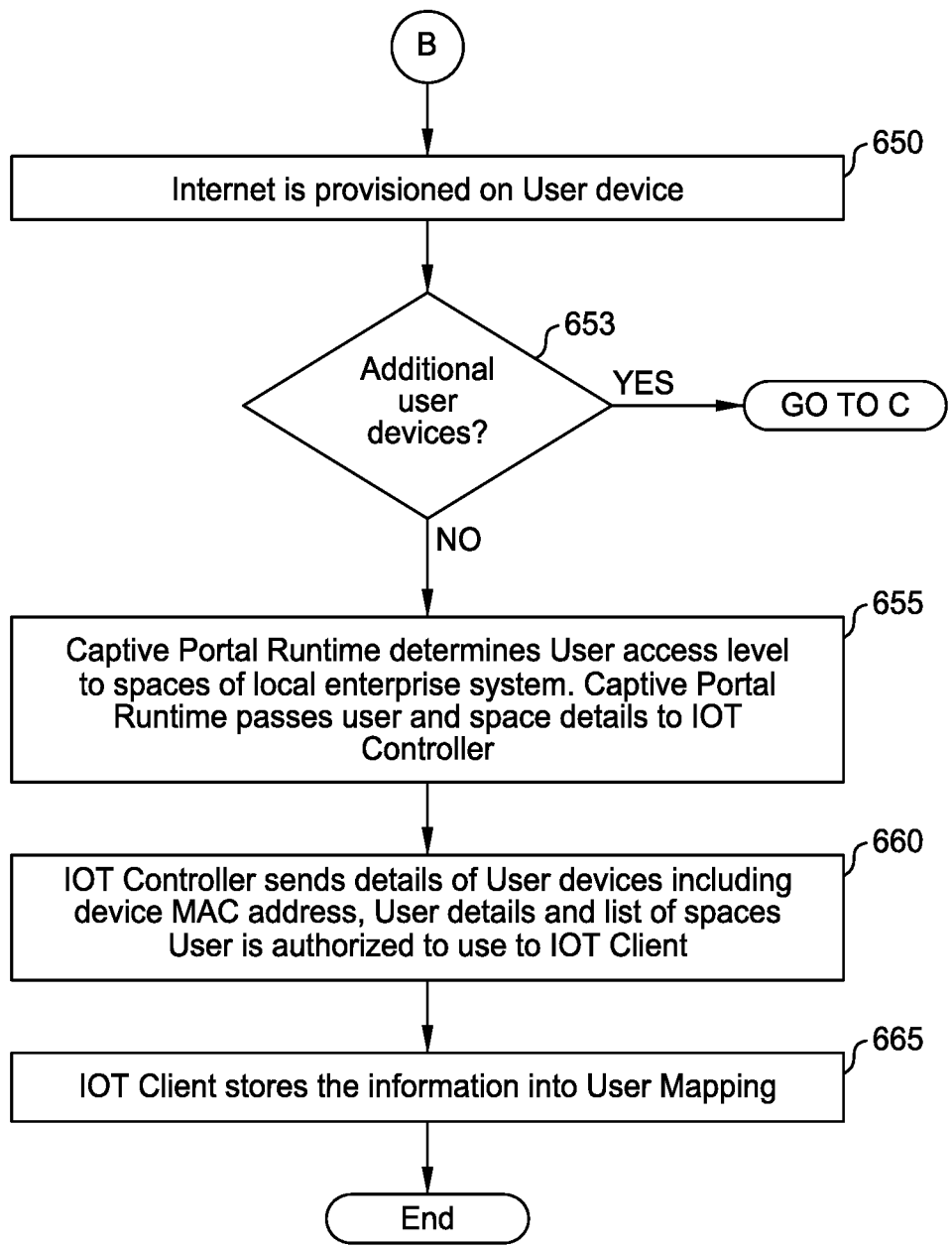

FIGS. 6A, 6B and 6C illustrate a method for a first connection, according to one embodiment of the present disclosure. Although the method steps are described in conjunction with FIGS. 1-9, persons skilled in the art will understand that any system configured to perform the method steps, in any order, falls within the scope of the present disclosure. The steps in this method are illustrative only and do not necessarily need to be performed in the given order they are presented herein. Some steps may be omitted completely.

The method 600 begins at block 605 when the user connects one or more user devices to the network at a local enterprise system over either a wired or wireless connection. A wired connection may be achieved by, for example, plugging a LAN cable that is connected to one of the network switches into a wired device. Wireless devices may be connected, for example, to wireless access points using methods that are specific to the wireless device and the configuration of the wireless access point. For example, in one embodiment, this connection is achieved by accessing the settings of the wireless device and choosing the Service Set Identifier (SSID) broadcast by a wireless access point. The wireless device will then negotiate with and connect to the wireless access point by any known means.

The method 600 then proceeds to block 610, where the user devices are associated with a user VLAN. That is, in an embodiment, each user device is assigned to a user VLAN. In some embodiments, all user devices belonging to or associated with a particular user (or group of users) are assigned to the same user VLAN. At block 615, one or more HTTP requests from user devices are redirected by wireless access points to the captive portal runtime. The method 600 continues to block 620, where the captive portal runtime presents the captive portal on each of the connected user devices, allowing the user and/or user device to be authenticated. At block 625, a determination is made regarding how the user is to be authenticated. In the illustrated embodiment, the user may be authenticated using a membership information system, a reservation credentials system, or both, according to one embodiment of the present disclosure.

In one embodiment, the membership information system allows for authentication of the user based on that user's membership information that is stored in a membership information database (not shown). Similarly, in one embodiment, the reservation credentials system allows the user to be authenticated based on a last name and room number (e.g., at a hotel or dormitory), or any other suitable personal information of the user. In some embodiments, authentication may occur based on a combination of one or more of these sub-methods.

In the illustrated embodiment, if the user is to be authenticated using membership information, the method 600 proceeds to block 630. At block 630, the captive portal runtime 245 validates the information provided by the user via the member system gateway. Further, at block 635, the member identifier and details are stored in the subscriber system. Finally, at block 650, Internet is provisioned on user devices. That is, the user devices are allowed access to the Internet via the access point.

Further, as illustrated, if the user is to be authenticated using reservation system credentials, the method 600 proceeds to block 640. At block 640, the captive portal runtime validates the information provided by the user via the reservation system gateway. At block 645, these authentication details can similarly be stored in the subscriber system. Finally, at a step 650, Internet is provisioned on user devices. That is, the user device(s) are allowed to access the Internet via the access point.

Once Internet has been provisioned on the user device, the method 600 proceeds to block 653, where a determination is made as to whether additional user devices remain to be authenticated. If at least one additional user device remains to be authenticated, the method 600 returns to step 610. Otherwise, the method 600 continues to block 655. At block 655, the captive portal runtime determines which (if any) logical spaces of the local enterprise system the user is allowed to access. In one embodiment, this determination may be made using the reservation system gateway. In one embodiment, the captive portal runtime passes the user and space details to the IOT controller, to be sent to the IOT client on the gateway. At block 660, the IOT controller sends, to the IOT client, details of user devices (e.g., device MAC address), user details, and a list of spaces the user is authorized to use. The method 600 then proceeds to block 665, where the IOT client stores the information into the user mapping, after which the method 600 ends.

Figure 7:
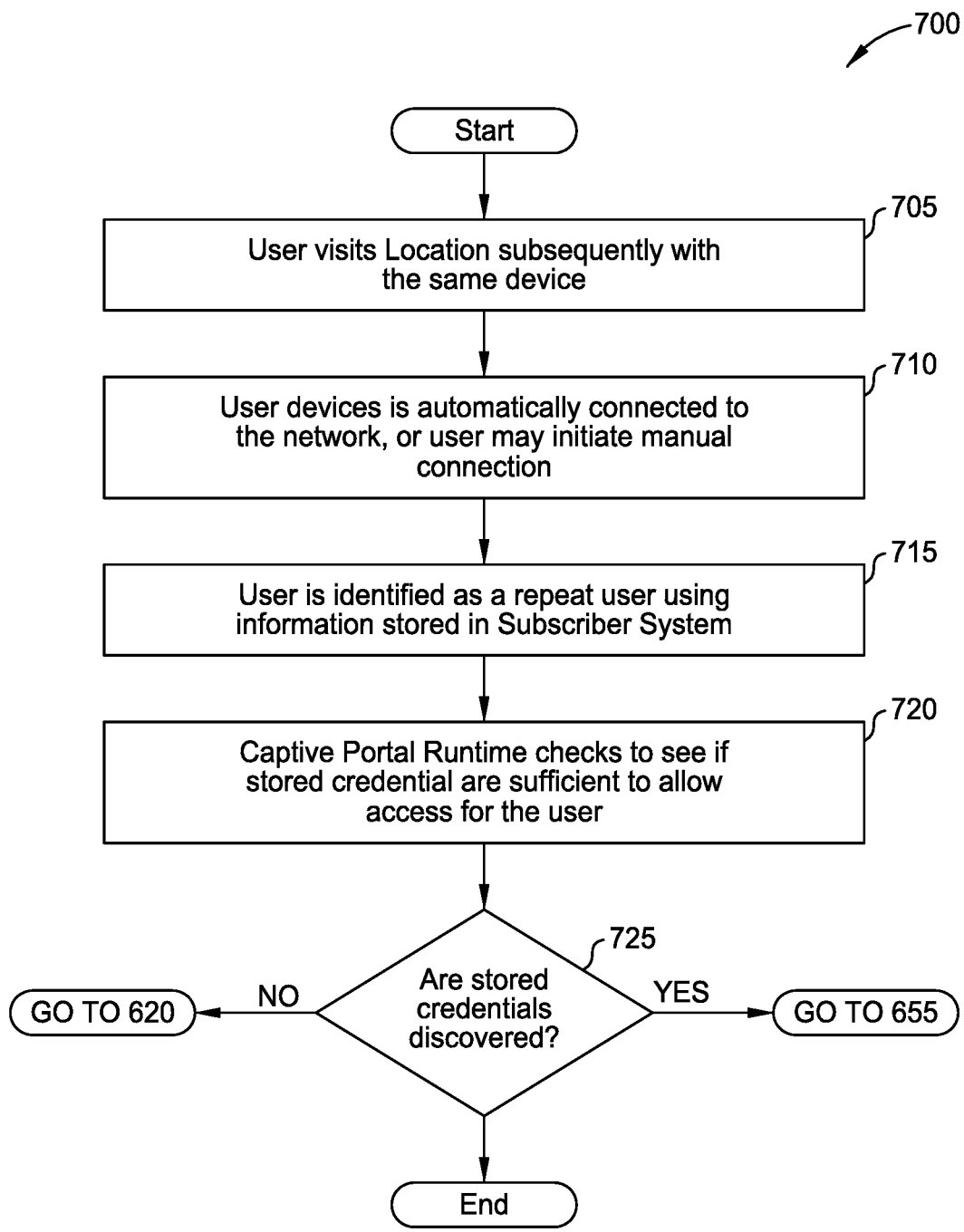
FIG. 7 is a flow diagram illustrating a method for subsequent connections, according to one embodiment of the present disclosure.

FIG. 7 illustrates a method for subsequent connections, according to one embodiment of the present disclosure. Although the method steps are described in conjunction with FIGS. 1-9, persons skilled in the art will understand that any system configured to perform the method steps, in any order, falls within the scope of the present disclosure. The steps in this method are illustrative only and do not necessarily need to be performed in the given order they are presented herein. Some steps may be omitted completely.

The method 700 begins at block 705, where the user visits the local enterprise system (e.g., returns to the hotel or other enterprise), and connects one or more user devices to the network over a wired or wireless connection. Further, at block 710, one or more user devices are automatically connected to the wireless network. In one embodiment, wireless devices may continuously scan for known Service Set Identifiers (SSIDs) and automatically initiate connection to the wireless network. In embodiments, the user may also initiate a manual connection either through wired or wireless means.

In one embodiment, method 700 allows for identification of users that have connected to a local enterprise system at least once in the past. At block 715, the user is identified as repeat user. In one embodiment, this identification is based on information stored in the subscriber system. The method 700 then proceeds to block 720, where the captive portal runtime checks to determine if stored credentials are sufficient to allow access for the user. At block 725, a determination is made as to whether the stored credentials are valid and sufficient. If not, the method 700 proceeds to step 620 of method 600 to validate the user. However, if the stored credentials are valid, the method 700 proceeds to step 655 of method 600, discussed in more detail above. In combination with automatic connecting capability of wireless devices described in step 710, this will allow seamless access to cast devices, when the user is in the proximity of a wireless access point, without any action by the user.

Figure 8:
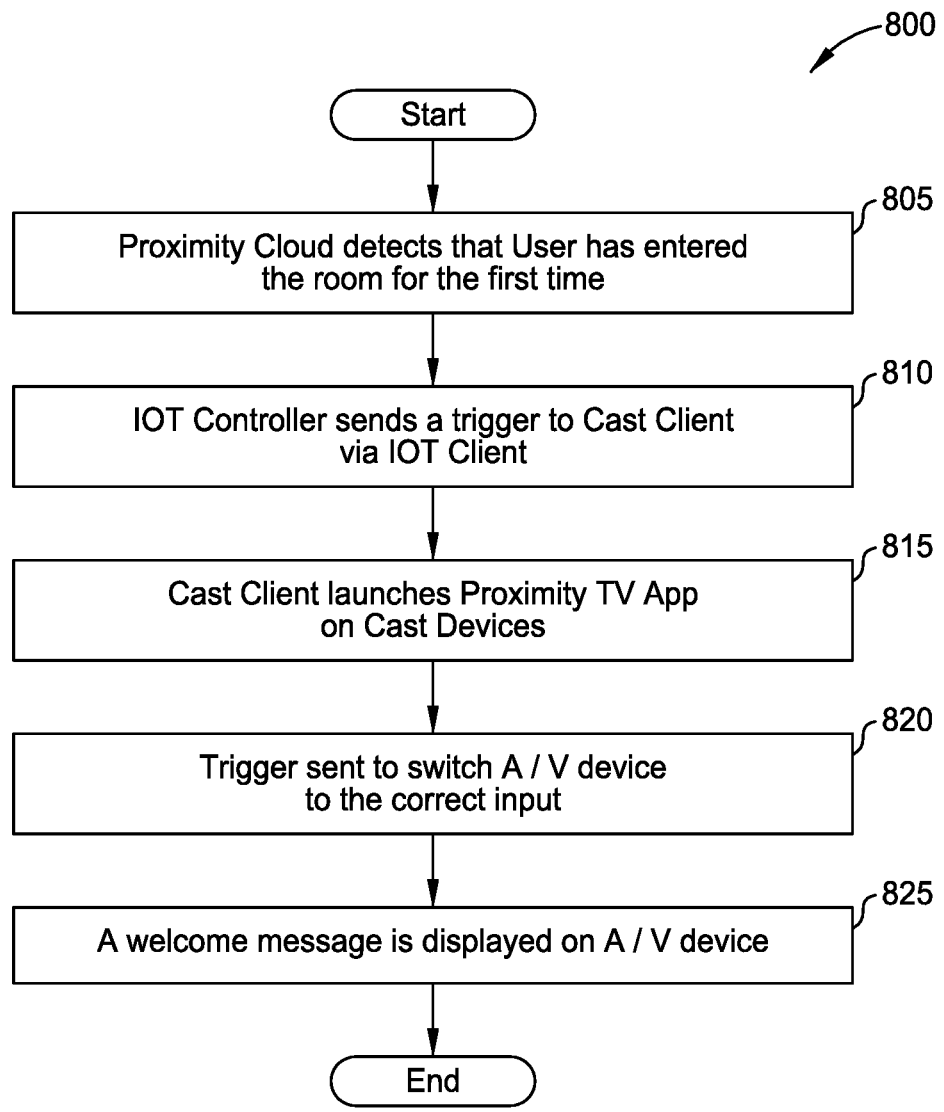
FIG. 8 is a flow diagram illustrating a method for handling a user entering a location, according to one embodiment of the present disclosure.
Figure 9A:
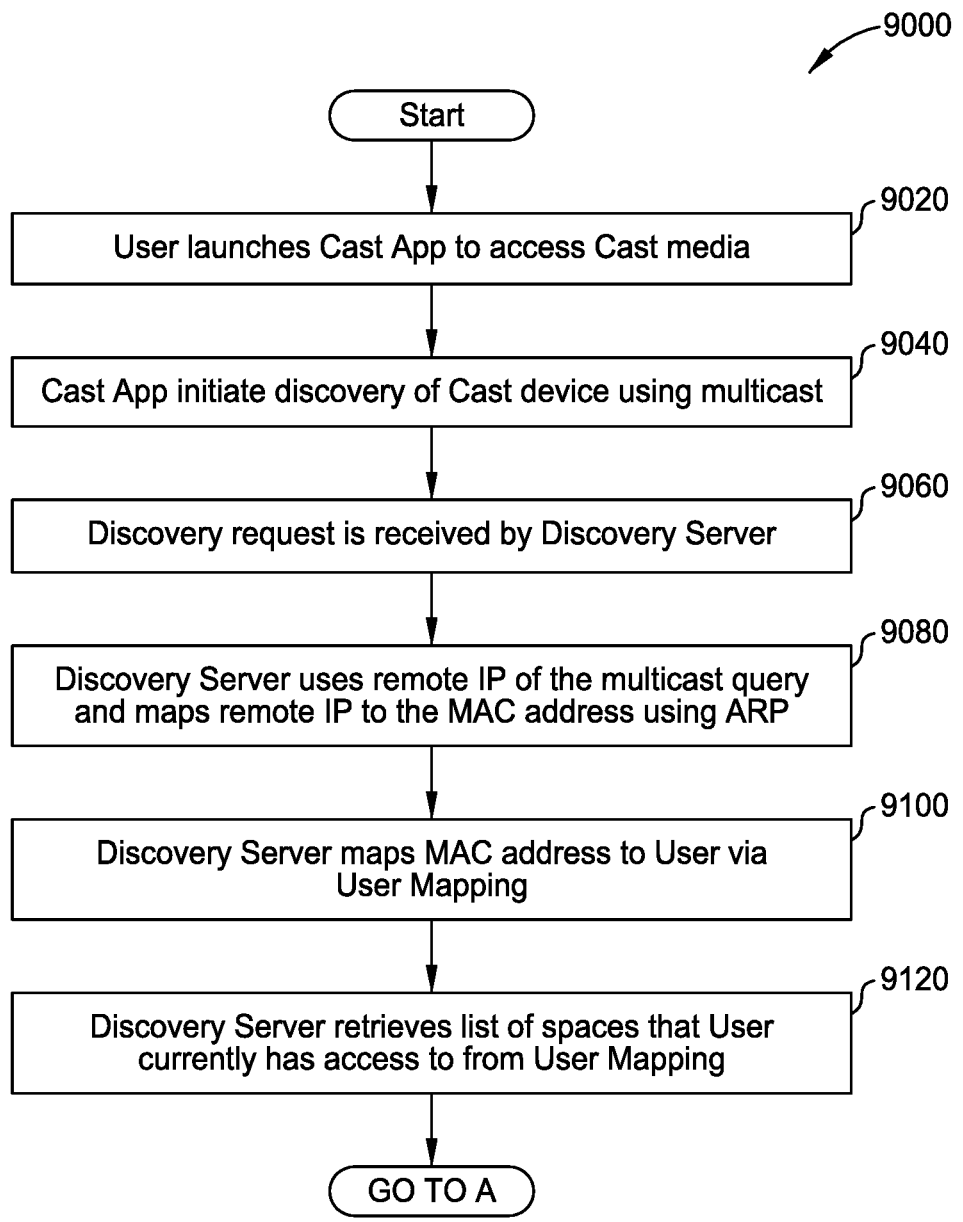
FIGS. 9A, 9B, 9C, 9D, 9E, 9F, 9G, 9H and 9J are flow diagrams illustrating a method for casting, according to one embodiment of the present disclosure.
Figure 9B:
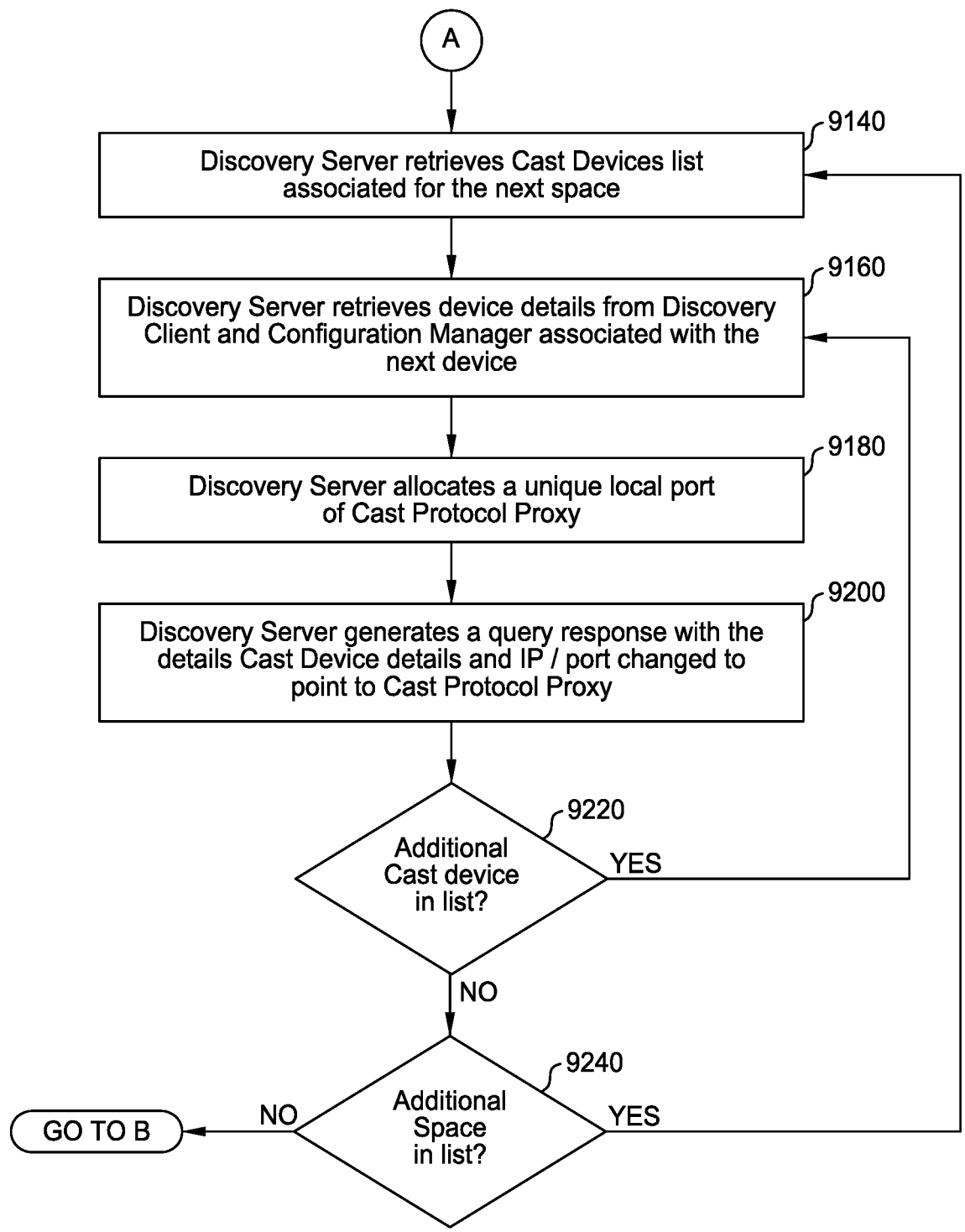
Figure 9C:
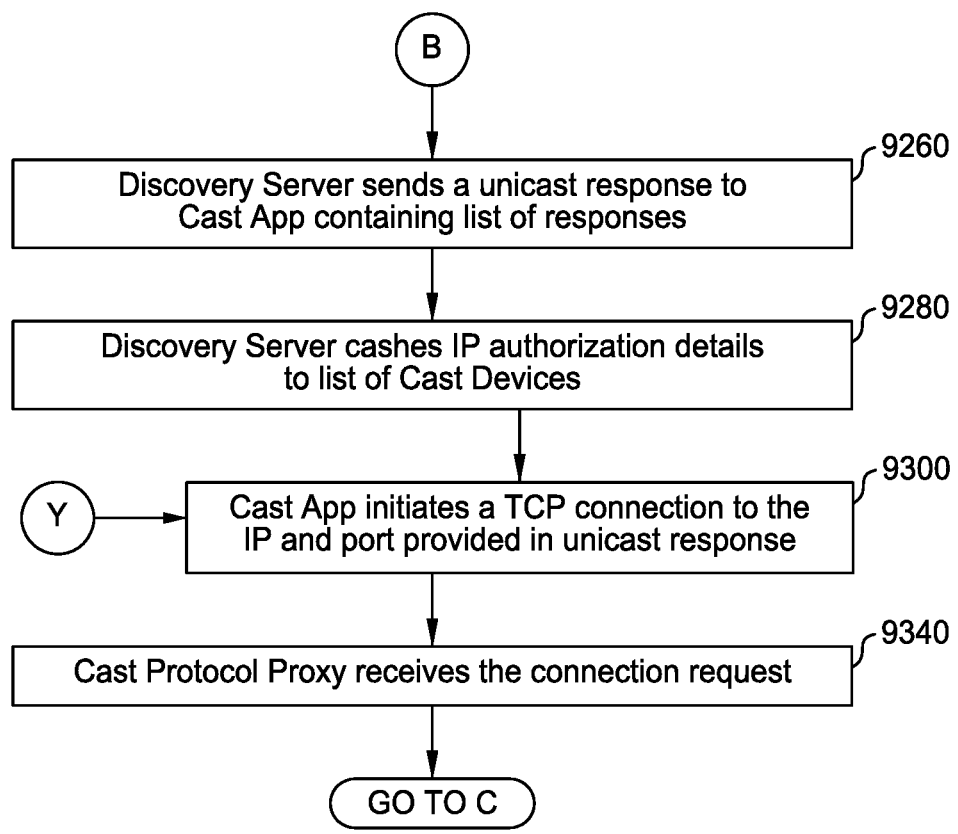
Figure 9D:
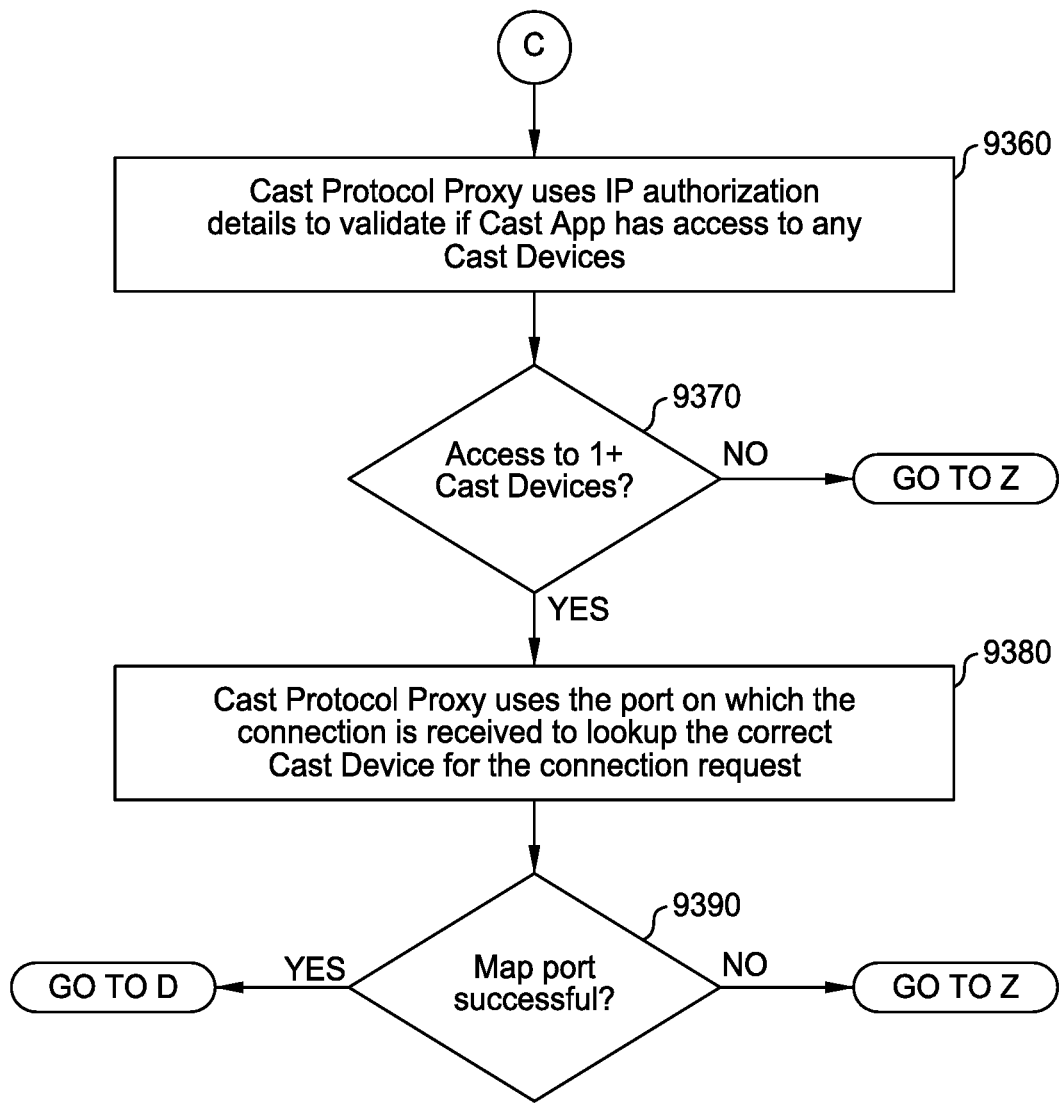
Figure 9E:
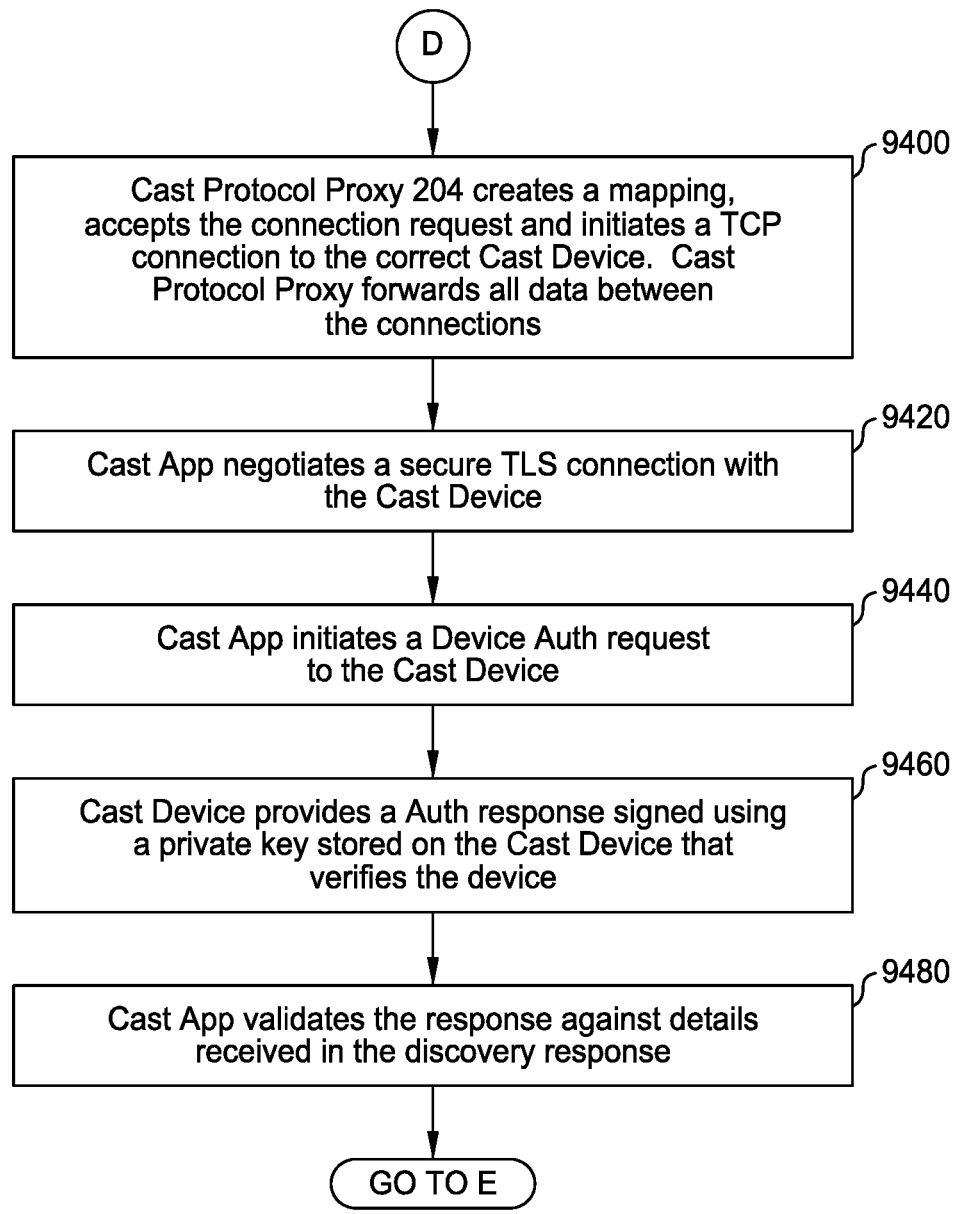
Figure 9F:
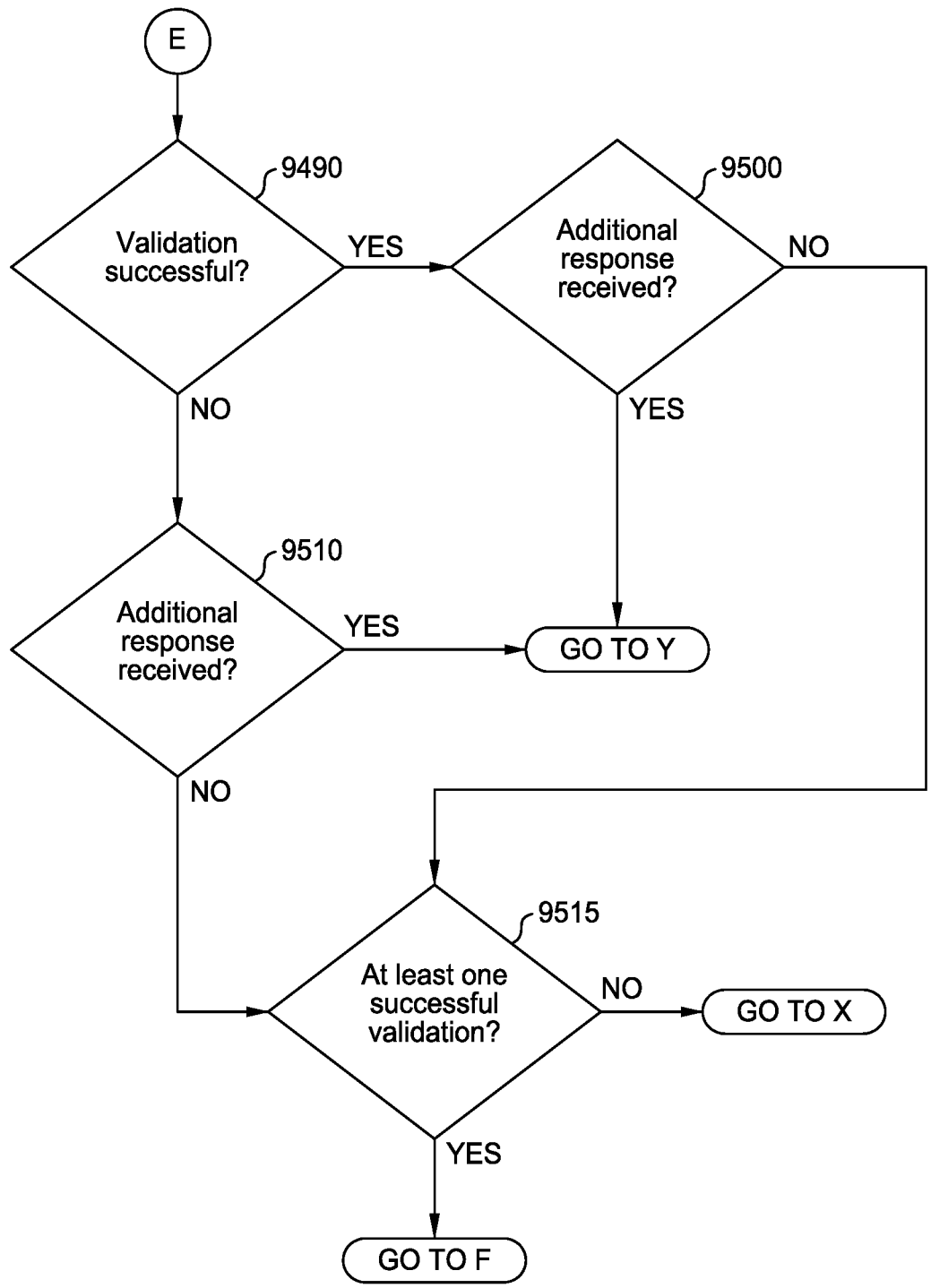
Figure 9G:
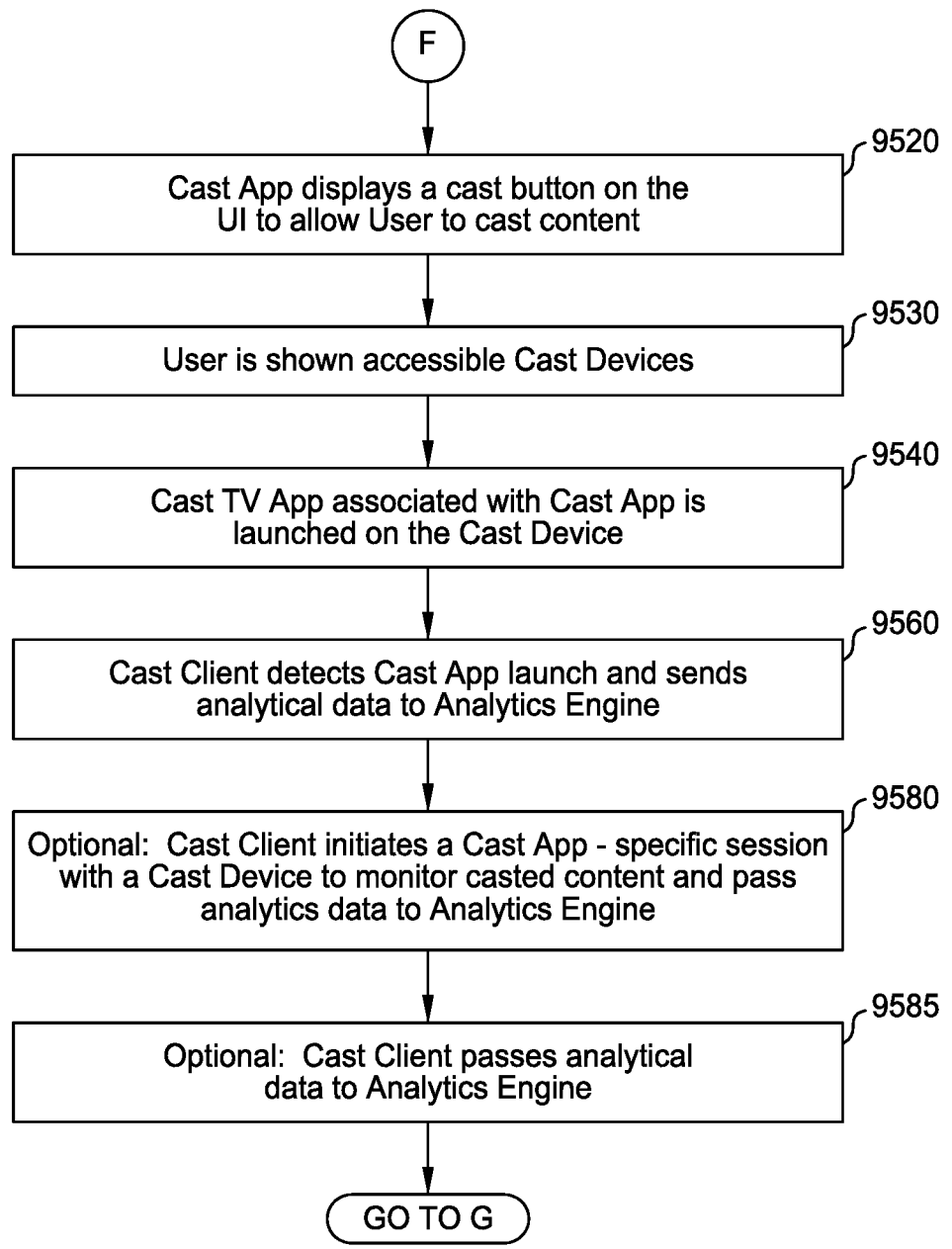
Figure 9H:
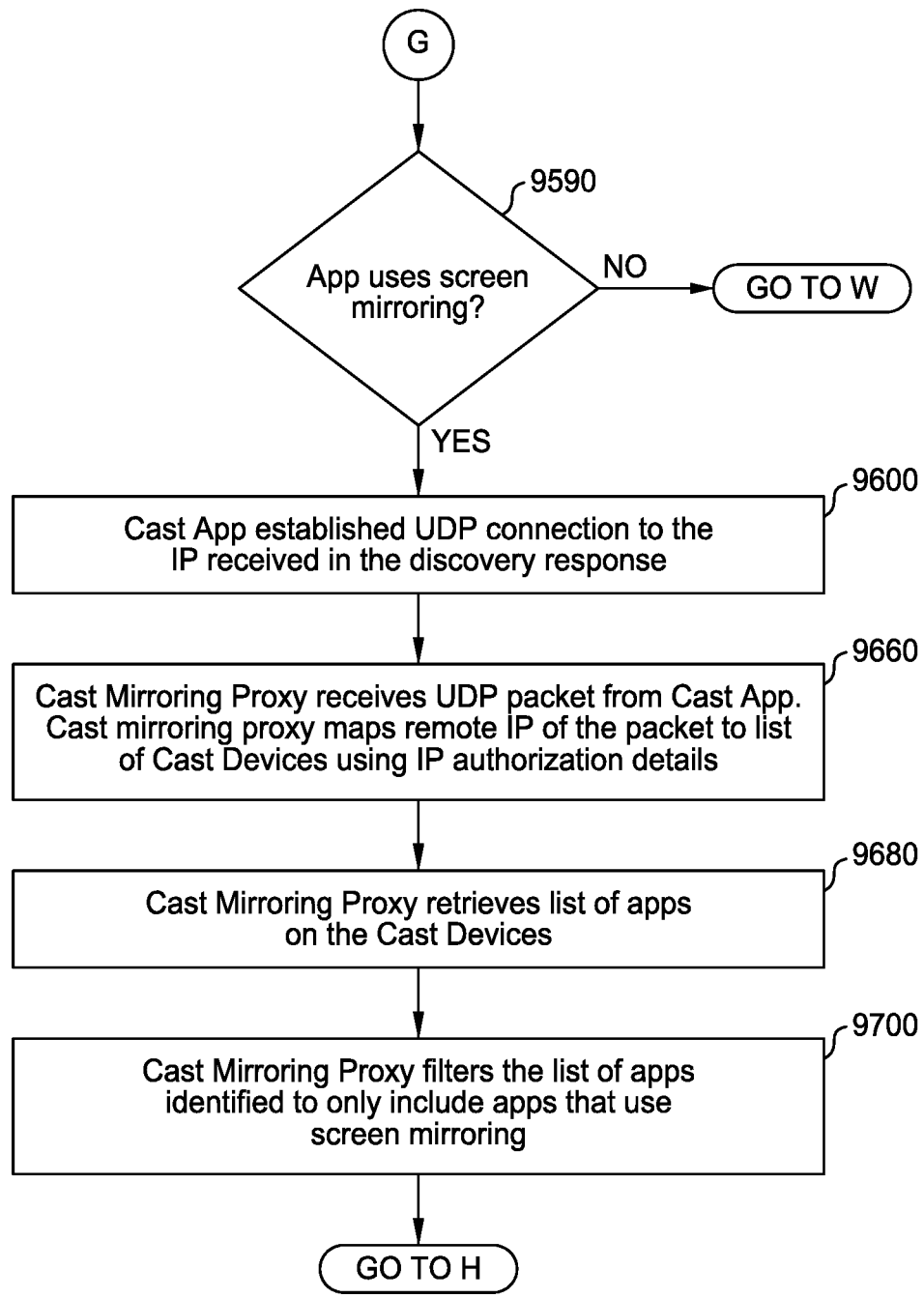
Figure 9J:
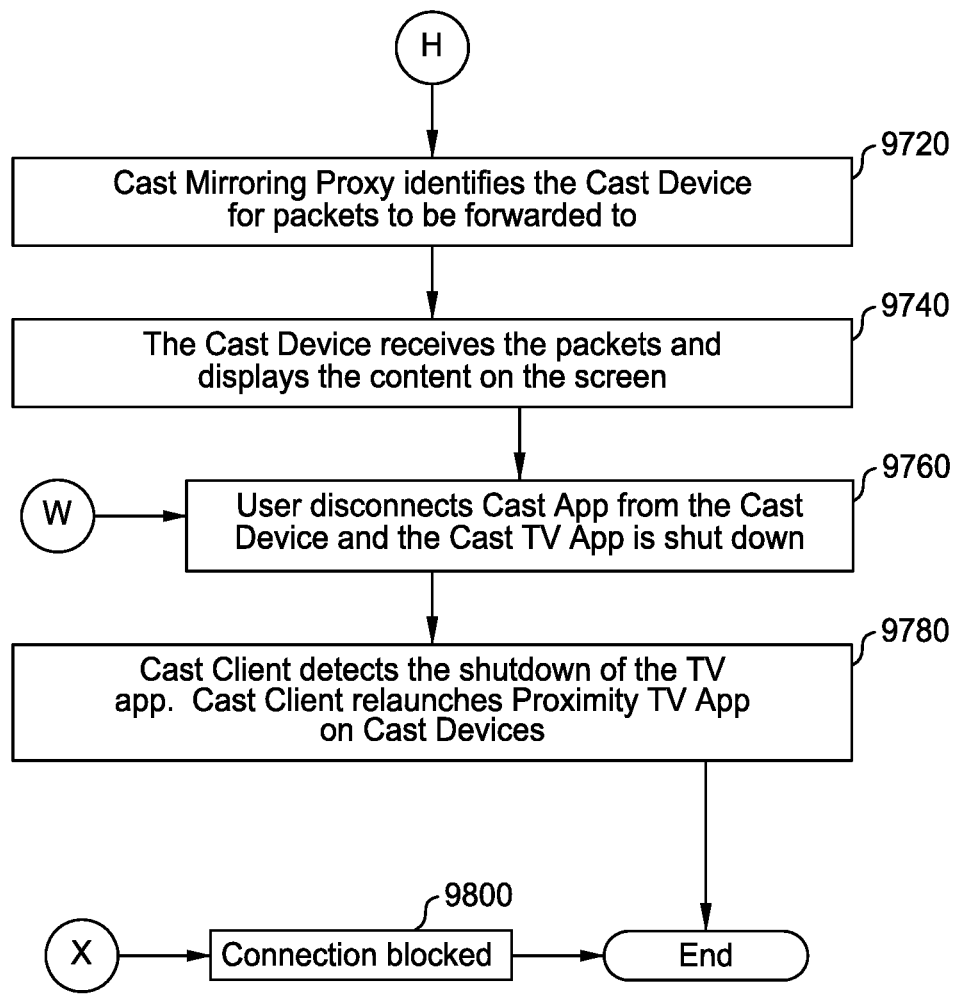

FIG. 8 illustrates a method for handling or responding to a user entering a location, according to one embodiment of the present disclosure. Although the method steps are described in conjunction with FIGS. 1-9, persons skilled in the art will understand that any system configured to perform the method steps, in any order, falls within the scope of the present disclosure. The steps in this method are illustrative only and do not necessarily need to be performed in the given order they are presented herein. Some steps may be omitted completely.

The method 800 begins at block 805, where the proximity cloud detects that the user has entered a room or other logical space for the first time. In embodiments, this determination may be made based on, for example, determining that one or more of the user's devices have connected to a wireless access point that is near or in the room or space. At block 810, the IOT controller transmits a trigger to launch the Proximity TV app to the cast client via the IOT client. The method 800 then proceeds to block 815, where the cast client launches the Proximity TV app on the cast device(s) associated with the space that the user entered. At block 820, a trigger is sent to any audio or display devices, causing them to turn on automatically and switch to the correct input. Finally, at block 825, a welcome message is displayed on the screen, after which the method 800 ends.

FIGS. 9A, 9B, 9C, 9D, 9E, 9F, 9G, 9H and 9J illustrate a method for casting, according to one embodiment of the present disclosure. Although the method steps are described in conjunction with FIGS. 1-9, persons skilled in the art will understand that any system configured to perform the method steps, in any order, falls within the scope of the present disclosure. The steps in this method are illustrative only and do not necessarily need to be performed in the given order they are presented herein. Some steps may be omitted completely.

The method 9000 begins after one or more user devices have been successfully connected to the Internet. At block 9020, the user launches a cast app. At block 9040, the user and/or the cast app initiates discovery of available cast devices using a multicast protocol (e.g., mDNS, SSDP or similar technology). The method 900 then proceeds to block 9060, where the discovery request is received by the discovery server (on the gateway). At block 9080, the discovery server determines the remote IP of the multicast query, and maps this remote IP to the MAC address of the user device, using Address Resolution Protocol (ARP) or other techniques. The method 900 then continues to block 9100, where the discovery server identifies the corresponding user, by accessing the user mapping database, which maps MAC addresses to users. In one embodiment, the user mapping database contains identification information including, but not limited to, MAC addresses and personal identification information for users.

The method 9000 then proceeds to block 9120, where the discovery server retrieves, from the user mapping database, a list of logical spaces that the user currently has access to. In one embodiment, for example, a space may be a hotel room or dormitory room which contains one or more cast devices which the guest(s) of the room are authorized to use. At block 9140, the discovery server selects a space in the received list of authorized spaces, and retrieves one or more list(s) of cast devices that are associated with the selected space. The method 900 then proceeds to block 9160, where the discovery server selects a cast device in the received list of cast devices associated with the selected space, and retrieves device details (such as the IP address and/or port number to be used in interacting with the cast device) from the discovery client and configuration manager for that cast device. At block 9180, the discovery server allocates a unique local port of the cast protocol proxy for the selected cast device (e.g., for the indicated port and IP address of each cast device).

The method 900 then proceeds to block 9200, where the discovery server generates a query response including details for the current cast device. In one embodiment, this response is modified such that the indicated IP address and port of the cast device are changed to point instead to the IP and port of the cast protocol proxy. In this way, when the user device attempts to transmit data to the cast device, it is routed to the cast protocol proxy, which can then forward it to the corresponding cast device (if the user is allowed access to the cast device at that time). At block 9220, a determination may be made as to whether there is at least one additional cast device the list of cast devices associated with the selected space. If one or more additional cast devices exist, the method 9000 returns to step 9160, and iterates for each cast device in the logical space. If no additional cast devices exist, the method 9000 proceeds to step 9240.

At block 9240, a determination is made as to whether there is at least one additional space in the received list of spaces that are associated with the user. If one or more additional spaces exist, the method 9000 returns to step 9140 to iterate for each logical space the user has permission to access. If no additional spaces exist, the method 9000 proceeds to block 9260. At block 9260, the discovery server transmits a unicast response to the cast app (e.g., executing on the user device(s)). In an embodiment, this response includes each of the generated query responses (e.g., it includes an indication as to the set of cast devices the user may access, and a corresponding IP address and port to use to interact with each such device). At a step 9280, the discovery server caches IP authorization details for the list of cast devices. In one embodiment, the discovery server similarly stores an indication as to the cast device (and the network address) that corresponds to each of the allocated local ports on the gateway. In this way, when a connection is received from a user device, the gateway can determine which cast device it should be forwarded to, and can forward it appropriately.

The method 900 then proceeds to block 9300, where the cast app (e.g., the user device) initiates a connection (such as a TCP connection) to one or more of the IP addresses and ports specified in the unicast response. For example, the user device may output a list of the available cast devices, and the user may select one or more for connection. As discussed above, in an embodiment, the gateway modified the response to include the IP address of the gateway (and one or more ports on the gateway device). Thus, then the user selects a cast device, the cast app transmits the connection request to the specified port on the gateway device. The method 900 continues to block 9340, where the cast protocol proxy receives this connection request. At block 9360, the cast protocol proxy utilizes the IP authorization details to validate if the cast app has access to any cast devices.

At block 9370, a determination is made as to whether the cast app (e.g., the user device or user) has access to at least one cast device. If so, the method 9000 proceeds to block 9380. If the user does not have access to any cast devices, the method 9000 proceeds to block 9800, where the connection is blocked and the method 9000 terminates. In one embodiment, block 9800 may have the effect of disabling the display of the cast button in the cast app, and may prevent the user from using cast features. At block 9380, the cast protocol proxy utilizes the port on which the connection is received to lookup the corresponding cast device for the connection request. The method 900 then proceeds to block 9390.

At block 9390, a determination is made as to whether the port was successfully mapped to a cast device (e.g., whether there is an identified cast device associated with the port on which the connection was received). If the port mapping was successful, the method 9000 proceeds to block 9400. If the map port was not successful, the method proceeds to block 9800, where the connection is blocked, and the method 9000 terminates.

At block 9400, the cast protocol proxy creates a mapping between the port and the cast device (if it did not already exist), accepts the connection request, and initiates a connection to the identified cast device. This, in an embodiment, the cast protocol proxy forwards all data between the connections. That is, in embodiments, the cast protocol proxy forwards all data received on the port to the corresponding cast device, and forwards all data received from the cast device to the user device via the corresponding port. The method 900 then proceeds to block 9420.

At block 9420, the cast app (e.g., the user device) negotiates a secure TLS connection with the cast device. At block 9440, the cast app transmits a Device Authentication request to the cast device. At block 9460, the cast device(s) provide a Device Authentication response. In one embodiment, this is achieved by signing a private key stored on the cast device, which can be used to verify the cast device. The method 900 then proceeds to block 9480, where the cast app validates the response against details received in the discovery response, in order to determine whether the response was received from the cast device (as opposed to a spoof or imposter). At block 9490, a determination is made as to whether validation is successful. If validation is successful, the method 9000 proceeds to block 9500. If validation was not successful, the method 9000 proceeds to block 9510.

Embodiments of the disclosure allow for multiple connections to be submitted by the user device for validation. Thus, at block 9500, a determination is made as to whether one or more additional responses have been received from the user device (e.g., at least one response from the cast app, attempting to set up an additional connection). If one or more additional responses have been received, the method 9000 returns to step 9300 to validate this connection request. If additional responses have not been received, the method 9000 proceeds to a step 9520. Further, in the illustrated embodiment, an unsuccessful validation of a first connection, additional responses may still be submitted for validation. At block 9510, a determination is made as to whether one or more additional connection requests have been received. If so, the method 9000 returns to block 9300. Otherwise, the method 9000 proceeds to block 9515.

At block 9515, a determination is made as to whether at least one connection was successfully validated. If at least one successful validation has occurred, the method 900 continues to block 9520. If no successful validations have occurred, the method 9000 continues to block 9800. At block 9520, the cast app displays a cast button on the user interface (UI) to allow the user to cast content if at least one cast device is discovered and validated. At block 9530, the user is shown a list of cast devices that the user has access to. By way of example and not limitation, the list presentation may be achieved when the user taps on a "cast button" presented in the user interface (UI) of the cast app.

In one embodiment, only cast devices that are associated with the user are shown to the user in the cast app UI. Advantageously, this occurs despite the possibility that other cast devices are part of the local enterprise system that the user is accessing. That is, because the gateway returns a list of cast devices that the user is allowed to access, the user does not receive or see any of the cast devices which they are not allowed to use. In this manner, only cast devices with user ownership rights are allocated and/or displayed to the user. In some embodiments, the user can choose one or more cast devices to connect to. In a further embodiment, if the user has access to only a single cast device, the cast app may auto-connect to that cast device without requiring the user to manually select the single cast device.

The method 900 then proceeds to block 9540, where the cast TV app associated with the cast app is launched on the selected cast device(s). At block 9560, the cast client can detect launch of the app, and transmit analytical data to an analytics engine via the IOT controller. Optionally, at block 9580, the cast client also initiates a cast app-specific session with the cast device, in order to monitor casting of content. Further, at an optional block 9585, the cast client passes analytical data to the analytics engine via the IOT controller.

At block 9590, a determination is made based on whether the cast app uses screen mirroring. If the app does not use screen mirroring, the method 9000 proceeds to block 9760, discussed in more detail below. If the app does use screen mirroring, the method 9000 proceeds to block 9600, where the cast app establishes a UDP connection to the IP address received in the discovery response (e.g., the IP address of the gateway). At block 9660, the cast mirroring proxy receives the UDP packet from the cast app. The cast mirroring proxy can then map the remote IP of the packet to the list of cast devices using IP authorization details. In one embodiment, these details were cached in block 9280.

In one embodiment, the cast mirroring proxy receives UDP packets from the cast app, and uses the remote IP to map to the user. At block 9680, the cast mirroring proxy can retrieve a list of apps on the cast devices. In one embodiment, the list of apps was identified in step 9660. A cast mirroring proxy can then retrieve currently running apps for the user. The method 900 then proceeds to block 9700, where the cast mirroring proxy filters the list of apps identified in step 9680. In one embodiment, apps that use screen mirroring are filtered from apps that do not use screen mirroring.

At block 9720, the cast mirroring proxy identifies the specific cast device that the packets have to be forwarded to. In some embodiments, a heuristics algorithm is employed to achieve this. The method 900 then continues to block 9740, where the cast device receives the packets, and displays the content on the screen. At block 9760, the user can disconnect the cast app from the cast device, and the cast TV app (e.g., in TV 185) is shut down. In another embodiment, the application may be shut down automatically by cast devices after a predetermined idle time. The method 900 then continues to block 9780. At block 9780, the cast client detects the shutdown of the cast TV app. In this block, the cast client can relaunch the Proximity TV app on cast devices, after which the method 9000 ends.

Figure 10A:
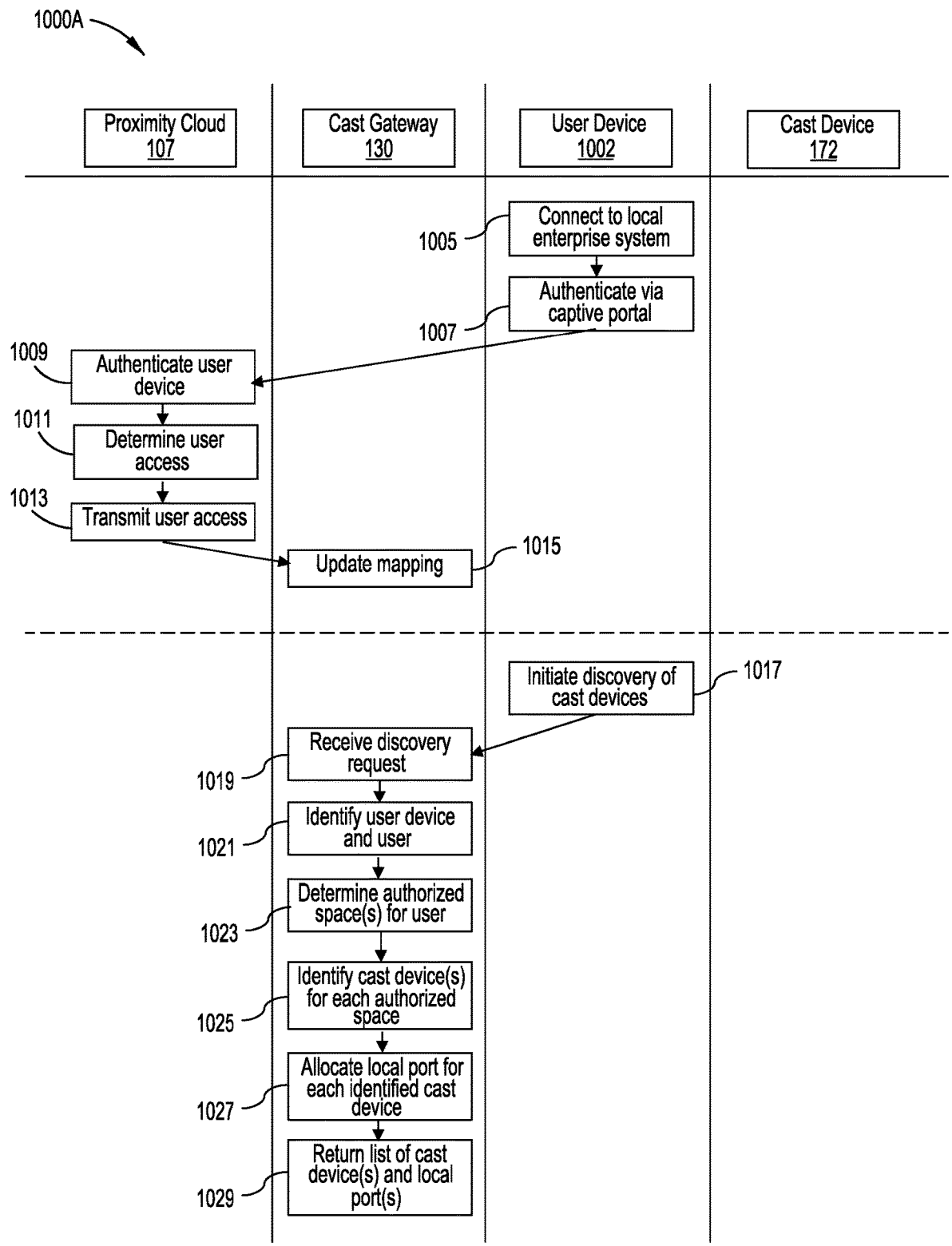
FIGS. 10A and 10B illustrate a workflow for enabling a user device to access an authorized cast device, according to one embodiment disclosed herein.
Figure 10B:
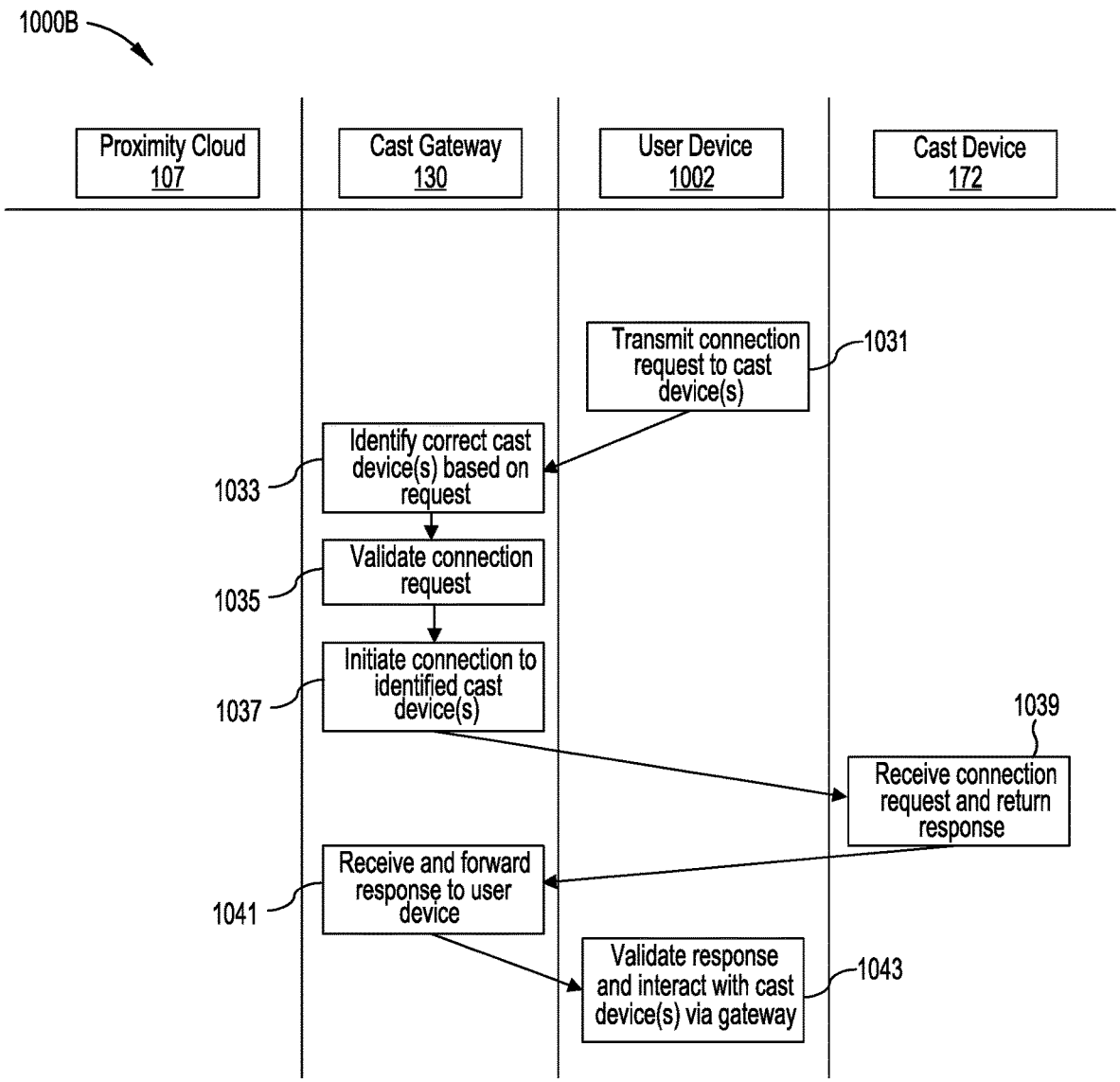

FIGS. 10A and 10B illustrate a workflow 1000 for enabling a User Device 1002 to access an authorized Cast Device 172, according to one embodiment disclosed herein. Specifically, FIG. 10A illustrates a workflow 1000A for allowing a User Device 1002 to connect to a local enterprise system and identify available Cast Devices 172, via a Cast Gateway 130. Further, FIG. 10B illustrates a workflow 1000B for facilitating interactivity between the User Device 1002 and the Cast Device 172. In the illustrated embodiment, the user device may be a Wired Device 145 or a Wireless Device 147. Generally, the User Device 1002 may be any device in the control of a user, including a laptop, mobile phone, and the like.

The workflow 1000A begins at block 1005, where a User Device 172 connects to a local enterprise system wirelessly or via a wired connection. As illustrated by block 1007, the User Device 172 is forwarded to a captive portal for authentication. In the illustrated embodiment, this authentication is performed by one or more components in a Proximity Cloud 107. In various embodiments, however, the authentication may be performed by a component on the local enterprise system. In some embodiments, the Cast Gateway 130 receives the initial connection request, and forwards it to the Proximity Cloud 107 for authentication. As illustrated, at block 1009, the Proximity Cloud 107 authenticates the User Device 1002 and/or the user who possesses the device.

The workflow 1000A then continues to block 1011, where the Proximity Cloud 107 identifies the user and determines what access the user is entitled to. In one embodiment, the Proximity Cloud 107 accesses a reservation system, member system, and the like in order to identify logically defined physical spaces that the identified user is entitled to occupy or control. Thus, in one embodiment, the determined user access is a list of logically defined spaces that the user is authorized or permitted to occupy or control. For example, the user access can include an indication of particular physical locations (e.g., a hotel room, a conference room, and the like) that is associated with the user. In some embodiments, the user access also includes an indication as to the time during which access is permitted.

At block 1013, the Proximity Cloud 1013 transmits this identified access to the Cast Gateway 130, which updates the user mapping and/or space mapping at block 1015. In this way, the Cast Gateway determines a list of logical spaces associated with the user. In some embodiments, rather than accessing the Proximity Cloud 107, the Cast Gateway 130 utilizes a data store local to the local enterprise system in order to determine the user access. At a subsequent point in time, at block 1017, the User Device 1002 initiates discovery of cast devices. That is, in the illustrated embodiment, the User Device 1002 attempts to discover available devices (e.g., Cast Devices 172 and/or Cast-Enabled A/V Devices 185). As illustrated, the Cast Gateway 130 intercepts or receives this request at block 1019.

The workflow 1000A then continues to block 1021, where the Cast Gateway 130 identifies the User Device 1002 from which the request was received, and determines the user(s) that are associated with that device. In one embodiment, this determination is made based on accessing the user mapping. At block 1023, the Cast Gateway 130 determines which spaces the user is authorized to access. In some embodiments, the Cast Gateway 130 accesses the user mapping and/or space mapping to make this determination. In one embodiment, the Cast Gateway 130 confirms that the mapping is accurate by checking it against the reservation system or other data store (or by accessing the Proximity Cloud 107). Once the authorized space(s) are identified, at block 1025, the Cast Gateway 130 identifies, for each authorized space, the cast devices that are associated with that space.

In this way, the Cast Gateway 130 builds a list of cast devices which the user is allowed to control. In the illustrated embodiment, at block 1027, the Cast Gateway 130 allocates a local port on the Cast Gateway 130 for each of the identified cast devices which the user is authorized to access. In this way, the Cast Gateway 130 can act as a proxy between the User Device 1002 and the Cast Device 172. As illustrated, the Cast Gateway 130 then transmits the list of authorized cast device(s) to the User Device 1002, along with the local port on the Cast Gateway 130 that corresponds to each cast device. In embodiments, this response may be a single communication including all of the devices. In one embodiment, the Cast Gateway 130 transmits a separate communication for each cast device. In this way, when the User Device 1002 wishes to connect to a cast device, it transmits the connection request to the indicated port on the Cast Gateway 130, which acts as a proxy to forward the communication (once it is validated or authenticated).

At a subsequent point in time, as illustrated at block 1031, the User Device 1002 transmits a connection request targeting a cast device. In an embodiment, as discussed above, the User Device 1002 transmits this request to the IP address and port number on the Cast Gateway 130 that corresponds to the desired cast device. Notably, in some embodiments, the Cast Gateway 130 acts a transparent proxy, and the User Device 1002 is not aware that it is not communicating directly with the Cast Device 172. That is, from the perspective of the User Device 1002, a request was transmitted to identify cast devices, and a list of devices was received, where each device is associated with a particular address and port number for further communication. In an embodiment, the User Device 1002 is unaware that the ports and address correspond to the Cast Gateway 130, rather than the Cast Devices 172 themselves.

At block 1033, the Cast Gateway 130 receives this connection request and identifies the desired cast device. In one embodiment, the Cast Gateway 130 makes this determination based on the port on which the request was received. That is, because each Cast Device 172 is assigned a respective port, in an embodiment, the Cast Gateway 130 can identify the desired cast device based on the port the connection request was sent to. At block 1035, the Cast Gateway 130 validates the request. In embodiments, this validation can include confirming that the user associated with the User Device 1002 is authorized to access the indicated Cast Device 172 (e.g., based on the space mapping and/or the current time and date). In an embodiment, if the validation fails, the Cast Gateway 130 can return an error to the User Device 1002.

In the illustrated embodiment, at block 1037, the Cast Gateway 130 initiates the connection to the identified cast device by transmitting a connection request (or forwarding the received connection request) to the Cast Device 172. In some embodiments, the Cast Gateway 130 requests a connection between itself and the Cast Device 172, rather than a connection directly to the User Device 1002. At block 1039, the Cast Device 172 receives the request, and returns an appropriate response, as discussed above. In the illustrated embodiment, this response is transmitted to the Cast Gateway 130, which, at block 1041, receives and forwards the response to the User Device 1002. Finally, at block 1043, the User Device 1002 validates the response (e.g., to confirm the identity of the Cast Device 172), and begins to interact with the Cast Device 172 as normal.

Notably, in some embodiments, the subsequent communications continue to flow through the Cast Gateway 130. In this way, the Cast Gateway 130 can ensure that the User Device 1002 does not access cast devices it is not authorized to interact with. Similarly, the Cast Gateway 130 ensures that other users are not able to control the functioning of the Cast Device 172 allocated to the user. In some embodiments, the Cast Gateway 130 performs similar validation or authentication on each communication, in order to ensure the authorization is still valid.

Figure 11:
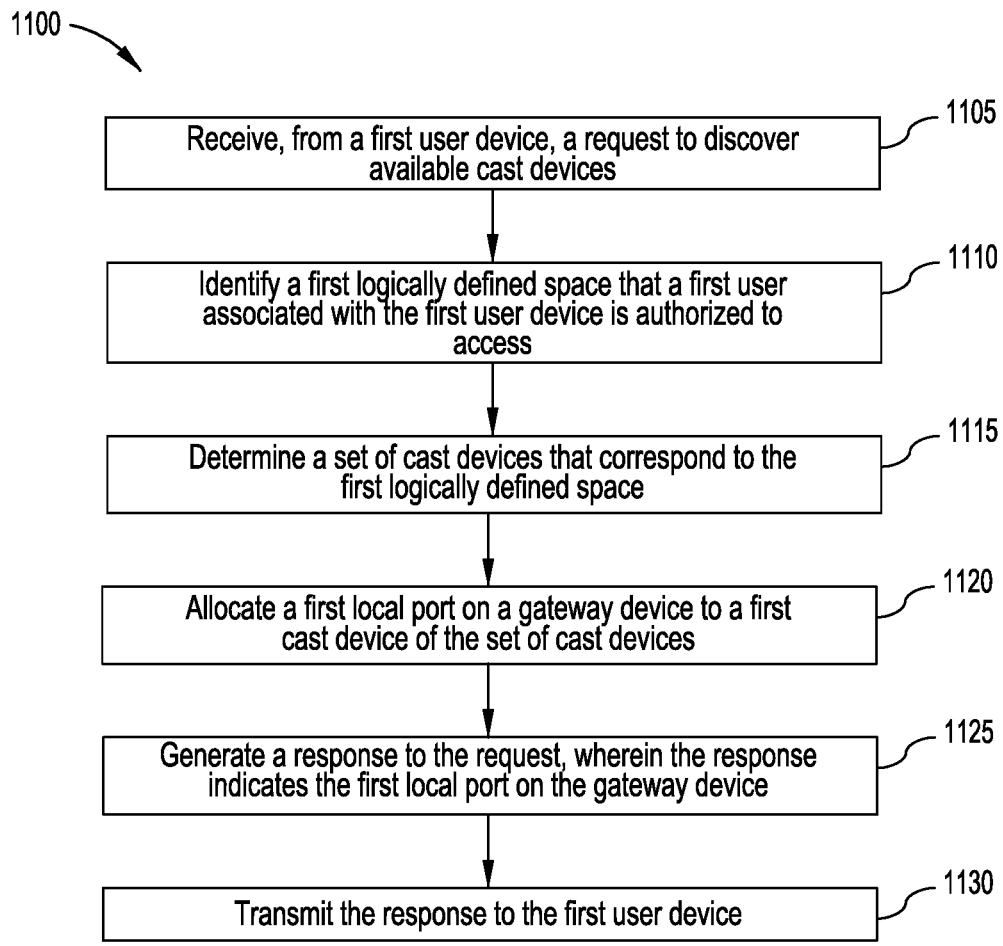
FIG. 11 is a flow diagram illustrating a method for facilitating communication between a cast device and a user device, according to one embodiment disclosed herein.

FIG. 11 is a flow diagram illustrating a method 1100 for facilitating communication between a cast device and a user device, according to one embodiment disclosed herein. The method 1100 begins at block 1105, where a Cast Gateway 130 receives, from a first user device, a request to discover available cast devices. At block 1110, the Cast Gateway 130 identifies a first logically defined space that a first user associated with the first user device is authorized to access. Further, at block 1115, the Cast Gateway 130 determines a set of cast devices that correspond to the first logically defined space. The method 1100 then proceeds to block 1120, where the Cast Gateway 130 allocates a first local port on the gateway device to a first cast device of the set of cast devices. At block 1125, the Cast Gateway 130 generates a response to the request, wherein the response indicates the first local port on the gateway device. Finally, at block 1130, the Cast Gateway 130 transmits the response to the first user device.

Embodiments of the disclosure can be utilized with conventional media streaming software that may normally be for home use. Advantageously embodiments disclosed here enable the streaming software to be extended to an enterprise setting. In addition, embodiments of the disclosure provide greater control and security than previous media streaming technology known. Furthermore, embodiments of the disclosure provide for intelligent pairing between user devices, user-accessible devices and localities assigned to the user. In this manner, locality owners and users alike may benefit from this intelligent pairing without concerning themselves over security breaches.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving first connection request from a first user device;
associating the first user device with a first user virtual local area network (VLAN);
receiving, from the first user device, a discover request to discover available cast devices;
identifying a first physical space that a first user associated with the first user device is authorized to access;
determining a set of cast devices that correspond to the first physical space;
allocating a first local port on a gateway device to a first cast device of the set of cast devices;
generating a response to the discover request, wherein the response indicates the first local port on the gateway device; and
transmitting the response to the first user device.

2. The method of claim 1, the method further comprising:
receiving, from the first user device, a second connection request on the first local port of the gateway device;
identifying the first local port was allocated for the first cast device; and
forwarding the second connection request to the first cast device.

3. The method of claim 1, the method further comprising:
receiving, from the first user device, a second connection request on a second local port of the gateway device;
identifying a second cast device for which the second local port was allocated; and
upon determining that the first user is not authorized to access the second cast device:
refraining from for forwarding the second connection request; and
returning an indication of error to the first user device.

4. The method of claim 1, wherein identifying the first physical space comprises:
accessing a reservation system to identify one or more physical spaces in a local enterprise system that the first user is authorized to occupy.

5. The method of claim 1, the method further comprising:
receiving a second connection request from a second user device; and
upon determining that the second user device is associated with the first user, associating the second user device with the first user VLAN.

6. The method of claim 1,
wherein the first user is one of a plurality of users present in a physical location,
wherein each of the plurality of users is associated with a respective user VLAN,
wherein the physical location includes a plurality of physical spaces, and
wherein each of the plurality of physical spaces is associated with a respective device VLAN.

7. The method of claim 1, the method further comprising:
upon determining that the first user has entered the first physical space, transmitting a trigger to cause the first cast device to power on and output an instructional message.

8. A gateway device comprising:
one or more computer processors; and
logic encoded in a non-transitory medium which when executed by the one or more computer processors performs an operation, the operation comprising:
receiving first connection request from a first user device;
associating the first user device with a first user virtual local area network (VLAN);
receiving, from the first user device, a discover request to discover available cast devices;
identifying a first physical space that a first user associated with the first user device is authorized to access;
determining a set of cast devices that correspond to the first physical space;
allocating a first local port on a gateway device to a first cast device of the set of cast devices;
generating a response to the discover request, wherein the response indicates the first local port on the gateway device; and
transmitting the response to the first user device.

9. The gateway device of claim 8, the operation further comprising:
receiving, from the first user device, a second connection request on the first local port of the gateway device;
identifying the first local port was allocated for the first cast device; and
forwarding the second connection request to the first cast device.

10. The gateway device of claim 8, wherein identifying the first physical space comprises:
accessing a reservation system to identify one or more physical spaces in a local enterprise system that the first user is authorized to occupy.

11. The gateway device of claim 8, the operation further comprising:
receiving a second connection request from a second user device; and
upon determining that the second user device is associated with the first user, associating the second user device with the first user VLAN.

12. The gateway device of claim 8,
wherein the first user is one of a plurality of users present in a physical location,
wherein each of the plurality of users is associated with a respective user VLAN,
wherein the physical location includes a plurality of physical spaces, and
wherein each of the plurality of physical spaces is associated with a respective device VLAN.

13. A computer product comprising logic encoded in a non-transitory medium, the logic executable by operation of one or more computer processors to perform an operation comprising:
receiving first connection request from a first user device;
associating the first user device with a first user virtual local area network (VLAN);
receiving, from the first user device, a discover request to discover available cast devices;
identifying a first physical space that a first user associated with the first user device is authorized to access;
determining a set of cast devices that correspond to the first physical space;
allocating a first local port on a gateway device to a first cast device of the set of cast devices;
generating a response to the discover request, wherein the response indicates the first local port on the gateway device; and
transmitting the response to the first user device.

14. The computer product of claim 13, the operation further comprising:
receiving, from the first user device, a second connection request on the first local port of the gateway device;
identifying the first local port was allocated for the first cast device; and
forwarding the second connection request to the first cast device.

15. The computer product of claim 13, wherein identifying the first physical space comprises:
accessing a reservation system to identify one or more physical spaces in a local enterprise system that the first user is authorized to occupy.

16. The computer product of claim 13, the operation further comprising:
receiving second connection request from a second user device; and
upon determining that the second user device is associated with the first user, associating the second user device with the first user VLAN.

17. The computer product of claim 13,
wherein the first user is one of a plurality of users present in a physical location,
wherein each of the plurality of users is associated with a respective user VLAN,
wherein the physical location includes a plurality of physical spaces, and
wherein each of the plurality of physical spaces is associated with a respective device VLAN.

* * * * *

UNITED STATES PATENT AND TRADEMARK OFFICE
CERTIFICATE OF CORRECTION

| | |
|---|---|
| PATENT NO. | : 11,184,364 B2 |
| APPLICATION NO. | : 16/244043 |
| DATED | : November 23, 2021 |
| INVENTOR(S) | : Vikas S. Murthy et al. |

It is certified that error appears in the above-identified patent and that said Letters Patent is hereby corrected as shown below:

In the Specification

In Column 1, Line 8, after "filed" delete "Mar.".

In Column 7, Line 26, delete "AN" and insert -- A/V --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*